US010609022B2

(12) United States Patent
Park et al.

(10) Patent No.: US 10,609,022 B2
(45) Date of Patent: Mar. 31, 2020

(54) METHOD AND APPARATUS FOR INSTALLING PROFILE FOR EUICC

(71) Applicant: Samsung Electronics Co., Ltd., Suwon-si, Gyeonggi-do (KR)

(72) Inventors: Jonghan Park, Bucheon-si (KR); Duckey Lee, Seoul (KR); Seonghun Kim, Suwon-si (KR); Heejeong Lee, Suwon-si (KR); Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 14/789,410

(22) Filed: Jul. 1, 2015

(65) Prior Publication Data
US 2016/0006728 A1     Jan. 7, 2016

(30) Foreign Application Priority Data
Jul. 1, 2014 (KR) ........................ 10-2014-0082064

(51) Int. Cl.
*H04L 29/06* (2006.01)
*H04W 12/00* (2009.01)
(Continued)

(52) U.S. Cl.
CPC .......... *H04L 63/0853* (2013.01); *H04W 4/80* (2018.02); *H04W 12/0023* (2019.01);
(Continued)

(58) Field of Classification Search
CPC .. H04L 63/0853; H04W 4/008; H04W 12/06; H04W 8/205; H04W 88/02; H04W 88/18; H04W 12/0023; H04W 4/80
(Continued)

(56) References Cited

U.S. PATENT DOCUMENTS

2006/0136395 A1    6/2006   Rhee et al.
2007/0115940 A1    5/2007   Kamen et al.
(Continued)

FOREIGN PATENT DOCUMENTS

CN    101820615 A    9/2010
CN    102308561 A    1/2012
(Continued)

OTHER PUBLICATIONS

"SCPTEC(13) 000058r1-eUICC-Profile-Provisioning_Procedure", ETSI Draft; SCPTEC(13) 000058R1_EUICC_Profile Provisioning Procedure , Eurō Pean Telecommunications Standards Institute (ETSI) , 650 , Route Des Lucioles F-06921 Sophia-Antipolis ; France, vol. SCP, Jun. 4, 2013 (Jun. 4, 2013), 1-6, XP014155592.
(Continued)

*Primary Examiner* — Michael Y Mapa
(74) *Attorney, Agent, or Firm* — Jefferson IP Law, LLP

(57) ABSTRACT

A method and an apparatus for installing a profile in a terminal including a universal integrated circuit card (UICC) corresponding to a smart card security module, which is inserted into a mobile communication terminal and then used are provided. More particularly, a method and an apparatus for remotely installing or removing mobile communication subscriber information in/from a profile of a terminal are provided. The terminal can remotely download the profile from a network server (subscription manager data preparation (SM-DP) or subscription manager secure routing (SM-SR)) without any change in a mobile network operator information technology (IT) system interface rather than downloading the profile of the terminal by the network server.

5 Claims, 20 Drawing Sheets

(51) Int. Cl.
  *H04W 4/80* (2018.01)
  *H04W 88/02* (2009.01)
  *H04W 12/06* (2009.01)
  *H04W 8/20* (2009.01)
  *H04W 88/18* (2009.01)

(52) U.S. Cl.
  CPC ........... *H04W 12/06* (2013.01); *H04W 88/02* (2013.01); *H04W 8/205* (2013.01); *H04W 88/18* (2013.01)

(58) Field of Classification Search
  USPC .............. 455/410–411, 418–420, 432.3, 558
  See application file for complete search history.

(56) References Cited

U.S. PATENT DOCUMENTS

| | | |
|---|---|---|
| 2011/0319133 A1 | 12/2011 | Dong |
| 2012/0108207 A1 | 5/2012 | Schell et al. |
| 2012/0159149 A1* | 6/2012 | Martin ................ H04L 63/0823 713/151 |
| 2012/0190354 A1* | 7/2012 | Merrien ................ H04W 4/001 455/422.1 |
| 2012/0260090 A1 | 10/2012 | Hauck et al. |
| 2013/0329683 A1 | 12/2013 | Berard et al. |
| 2013/0339305 A1 | 12/2013 | Kim et al. |
| 2013/0340040 A1* | 12/2013 | Park ........................ H04L 63/08 726/3 |
| 2013/0344864 A1 | 12/2013 | Park et al. |
| 2014/0024343 A1* | 1/2014 | Bradley .................. H04W 4/70 455/411 |
| 2014/0106728 A1* | 4/2014 | Aboulhosn ........... H04W 8/205 455/418 |
| 2014/0219447 A1 | 8/2014 | Park et al. |
| 2014/0329502 A1* | 11/2014 | Lee ........................ H04W 12/06 455/411 |
| 2015/0134561 A1* | 5/2015 | Ashley .................. G06Q 99/00 705/342 |
| 2015/0237551 A1* | 8/2015 | Jin ........................ H04W 36/14 370/331 |
| 2016/0283216 A1* | 9/2016 | Gao ....................... H04W 12/10 |

FOREIGN PATENT DOCUMENTS

| | | |
|---|---|---|
| CN | 103250434 A | 8/2013 |
| CN | 103329578 A | 9/2013 |
| CN | 103329586 A | 9/2013 |
| CN | 103546886 A | 1/2014 |
| WO | 2013-036011 A2 | 3/2013 |

OTHER PUBLICATIONS

Reprogrammable SIMs: Technology ,Evolution and Implications Final Report, Sep. 25, 2012 (Sep. 25, 2012), pp. 1-95 , XP055126567.

Ohinese Office Action dated Jul. 17, 2019, issued in a counterpart Chinese application No. 201580044564.8.

* cited by examiner

METHOD AND APPARATUS FOR INSTALLING PROFILE FOR EUICC

CROSS-REFERENCE TO RELATED APPLICATION(S)

This application claims the benefit under 35 U.S.C. § 119(a) of a Korean patent application filed on Jul. 1, 2014 and assigned Serial number 10-2014-0082064, the entire disclosure of which is hereby incorporated by reference.

TECHNICAL FIELD

The present disclosure relates to a method and an apparatus for installing a profile in a terminal in a technical field related to a universal integrated circuit card (UICC) corresponding to a smart card security module, which is inserted into a mobile communication terminal and then used. More particularly, the present disclosure relates to a management technology, which remotely installs/removes mobile communication subscriber information in/from an embedded UICC (eUICC) instead of a UICC including communication service company information during a manufacturing process.

BACKGROUND

A universal integrated circuit card (UICC) is a smart card inserted into a mobile communication terminal, which stores personal information such as network access authentication information, a phone book, and a short message service (SMS) of a mobile communication subscriber and perform functions of authenticating a user and generating a traffic security key when the user accesses a mobile communication network such as global system for mobile communications (GSM), wideband code division multiple access (WCDMA), or long term evolution (LTE), thereby allowing the user to use stable mobile communication. The UICC has a communication application such as a subscriber identification module (SIM), a universal SIM (USIM), or an Internet protocol (IP) multimedia SIM (ISIM) according to the type of a mobile communication network which the user accesses, and also provides a high level security function to have various applications such as an electronic wallet, ticketing, and an electronic passport.

The UICC of the related art is manufactured as a dedicated card for a particular mobile network operator by a request from the corresponding mobile network operator when the card is manufactured, and the card is released after authentication information (for example, a USIM application and an international mobile subscriber identity (IMSI) or K value) for the access to the network by the corresponding service provider is inserted into the card. Accordingly, the manufactured UICC is received by the corresponding mobile network operator and then provided to a user. Then, an application within the UICC is managed, for example, installed, modified, and removed using an over the air (OTA) technology as needed. The user can use a network and application service of the corresponding mobile network operator by inserting the UICC into a mobile communication terminal of the user. Further, if the user changes the terminal, the user can continue to use authentication information, mobile communication phone numbers, and a personal phone book through a new terminal by inserting the UICC of the terminal of the related art into the new terminal.

Meanwhile, a physical shape and a logical function of the UICC are defined by a standardization organization such as a European telecommunications standards institute (ETSI), and thus international compatibility thereof is maintained. In an aspect of a form factor defining a physical form, the sizes of the mini SIM, which is most widely used, the micro SIM, which has started being used a few years ago, and the nano SIM, which is recently used, are sequentially and gradually reduced. Accordingly, it has significantly contributed to the small size of the mobile communication terminal. However, it is difficult to expect the standardization of the UICC card, which is smaller than the recently manufactured nano SIM, due to the loss of the UICC card. Further, since the UICC card requires a space to install a removable slot in the terminal on characteristic thereof, the smaller size thereof is expected to be difficult.

Further, the removable UICC is not suitable for machine-to-machine (M2M) devices such as intelligent home appliances, electric/water meters, and closed circuit television (CCTV) cameras, which require access to a mobile communication data network without any direct control by a person in various installation environments.

In order to address the above problems, a method of replacing the UICC with a security module, which performs a similar function to that of the UICC, may be considered. An embedded UICC (eUICC) may refer to a UICC, which can be downloaded and installed a subscriber identification and encryption key according to each communication service company. The security module may be installed within the terminal when the terminal is manufactured in such a manner that the security module cannot be attached to/detached from the inside of the terminal. In this case, unless the terminal is manufactured as a terminal dedicated for a particular mobile network operator, the terminal cannot have in advance network access authentication information of the particular mobile network operator such as IMSI and K of the USIM when the terminal is manufactured, and the user who purchases the corresponding terminal can configure the authentication information after the user subscribes to the particular mobile network operator.

Further, unlike the UICCs of the related art, which have been manufactured and distributed only for the particular mobile network operator, the eUICC can stably and flexibly install and manage authentication information of various mobile network operators after the user who purchases the corresponding terminal subscribes to and abandons the subscription to the particular mobile network operator or changes the subscription to the particular mobile network operator to another mobile network operator.

More specifically, a mobile network operator information technology (IT) system of the related art processes only mobile communication opening using the UICC. Accordingly, in order to process opening of the new terminal equipped with the eUICC, it is required to change a mobile network operator IT system interface.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a stable method of remotely inserting universal integrated circuit card (UICC) information of various mobile network operators into a security module, which replaces a UICC of the related art through a network.

Another aspect of the present disclosure is to provide a method and an apparatus for allowing a terminal to remotely download a profile from a network server actively. That is, the present disclosure provides a method and an apparatus for allowing the terminal to remotely download a profile from a network server (subscription manager data preparation (SM-DP) or subscription manager secure routing (SM-SR)) by itself without any change in a mobile network operator information technology (IT) system interface rather than allowing the network server to download the profile of the terminal initiatively.

In accordance with an aspect of the present disclosure, a method of installing a profile by a terminal including a UICC is provided. The method includes acquiring authentication information used for an installation of a profile in the terminal, transmitting the acquired authentication information to a profile management server for managing the UICC included in the terminal, and, if the authentication information is verified by the profile management server or a profile generation server, receiving a profile corresponding to the authentication information from the profile management server.

In accordance with another aspect of the present disclosure, a terminal including a UICC is provided. The terminal includes a communication unit configured to perform data communication; and a controller is configured to transmit acquired authentication information to a profile management server for managing the UICC included in the terminal, and, if the authentication information is verified by the profile management server or a profile generation server, to receive a profile corresponding to the authentication information from the profile management server.

In accordance with another aspect of the present disclosure, a method of providing a profile for a terminal including a UICC by a profile generation server is provided. The method includes generating authentication information used for authenticating a profile to be provided to the terminal and for the terminal to download the profile and transmitting the profile based on a verification result of the authentication information for the terminal to download the profile.

In accordance with another aspect of the present disclosure, a server for providing a profile to a terminal including a UICC is provided. The server includes a communication unit configured to perform data communication and a controller configured to generate authentication information used for authenticating a profile to be provided to the terminal and for the terminal to download the profile, and to transmit the profile based on a verification result of the authentication information on the terminal to download the profile.

In accordance with another aspect of the present disclosure, a method of providing a profile for a terminal including a UICC by a profile management server is provided. The method includes receiving authentication information used for an installation of a profile from the terminal, receiving the profile according to a verification result of the authentication information, and transmitting the received profile to the UICC included in the terminal.

In accordance with another aspect of the present disclosure, a server for providing a profile to a terminal including a UICC is provided. The server includes a communication unit configured to perform data communication and a controller configured to receive authentication information used for an installation of a profile from the terminal, to receive the profile according to a verification result of the authentication information, and to transmit the received profile to the UICC included in the terminal.

According to various embodiments of the present disclosure, the terminal can remotely download a profile from a network server (SM-DP or SM-SR) by itself without any change in a mobile network operator IT system interface rather than the network server downloading the profile of the terminal initiatively.

According to various embodiments of the present disclosure, it is possible to download the profile in an eUICC without any change in the mobile network operator IT system.

According to various embodiments of the present disclosure, it is possible to perform a verification to more stably download the profile.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
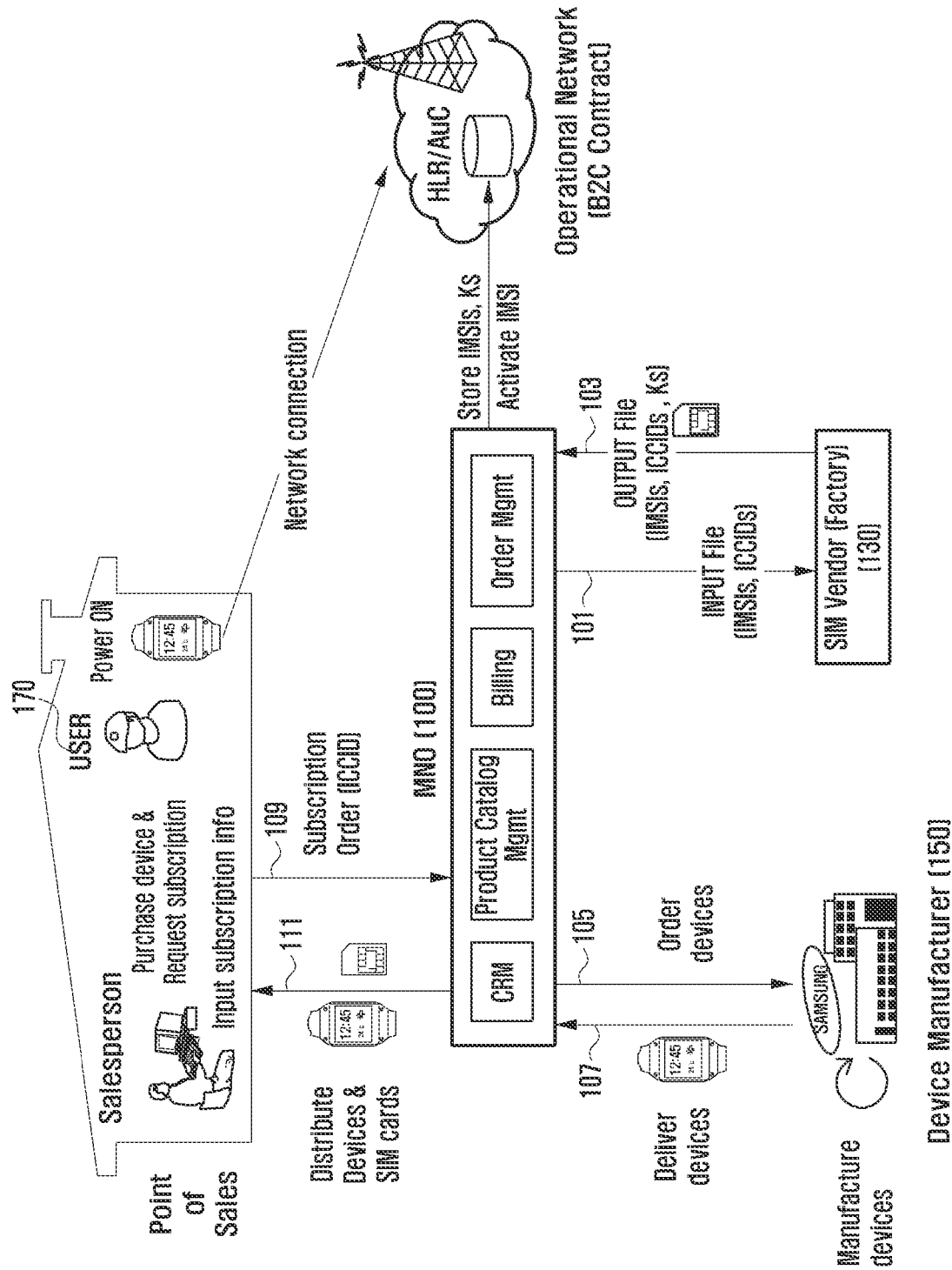
FIG. 1 illustrates a process of distributing and opening a terminal using a universal integrated circuit card (UICC) of the related art according to an embodiment of the present disclosure (subscriber information module (SIM) card)

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, the terms used in the present disclosure will be defined.

In the present disclosure, a universal integrated circuit card (UICC) is a smart card inserted into a mobile communication terminal, which refers to a chip that stores personal information such as network access authentication information, a phone address book, and a short message service (SMS) of a mobile communication user and perform functions of authenticating a user and generating a traffic security key when the user accesses a mobile communication network such as global system for mobile communications (GSM), wideband code division multiple access (WCDMA), or long term evolution (LTE), thereby allowing the user to use stable mobile communication. The UICC has a communication application such as a subscriber identification module (SIM), a universal SIM (USIM), or an Internet protocol (IP) multimedia SIM (ISIM) according to the type of a mobile communication network which the user accesses, and also provides a high level security function to have various applications such as an electronic wallet, ticketing, and an electronic passport. In the present disclosure, the term UICC is interchangeably used with the term SIM. An eUICC may refer to a UICC, which can download and install a subscriber identification and encryption key according to each communication service company. According to various embodiments of the present invention, the eUICC can be detachable and/or replaceable. That is, the eUICC is included in the UICC, and may be used as a UICC, eUICC, or embedded SIM (eSIM) in the present disclosure.

In the present disclosure, a profile may refer to packaging of information included in the UICC in a software form.

In the present disclosure, a USIM profile may have the same meaning as the profile or refer to packaging of information included in a USIM application within the profile in a software form.

In the present disclosure, an operational profile may refer to packaging of subscription information of a mobile network operator to which a user of the terminal subscribes in a software form.

In the present disclosure, a provisioning profile is a profile required when the user accesses a predetermined mobile communication network of a predetermined nation through the terminal before subscribing to a particular communication service company, and may refer to a profile installed in the eUICC in advance.

In the present disclosure, a subscription manager data preparation (SM-DP) may be expressed as a profile provision server, an off-card entity of profile domain, a profile encryption server, a profile generation server, a profile provisioner, or a profile provider.

In the present disclosure, a subscription manager secure routing (SM-SR) may be expressed as a profile management server, an off-card entity of eUICC profile manager, or a profile manager.

In the present disclosure, an issuer security domain root (ISD-R) (eUICC profile manager) may be expressed as a profile manager, and may be a control module, which decrypts an over the air (OTA) message that is encrypted within the eUICC/eSIM and transmitted by the SM-SR server and performs a function of downloading, enabling, disabling, or deleting the profile.

In the present disclosure, a profile identifier (ID) may be referred to as a factor, which matches an integrated circuit card ID (ICCID) and an issuer security domain profile (ISD-P). The profile ID may refer to a unique identification of each profile.

In the present disclosure, an embedded universal integrated circuit card (E-UICC) ID may be a unique identification of the eUICC included in the terminal and may be referred to as an EID. Further, when the provisioning profile is pre-installed in the eUICC, the E-UICC ID may be a profile ID of the corresponding provisioning profile. In addition, when the terminal cannot be separated from the eUICC (or eSIM) chip according to an embodiment of the present disclosure, the E-UICC ID may be a terminal ID. Moreover, the E-UICC ID may refer to a particular secure domain of the eSIM chip.

In the present disclosure, Auth codes are random numbers generated by the SM-DP and may be used for processing normal opening only when an opening request including the corresponding random numbers is made.

In the present disclosure, an SM-DP address is an IP address, a uniform resource locator (URL) or an SM-DP server address in the form of an ID, and may be used when the SM-SR identifies the SM-DP, which may generate a particular profile, among a plurality of SM-DPs.

In the present disclosure, a pull mode indicator may be a distinguisher that indicates the profile, which is downloaded by the eUICC/eSIM, triggered and downloaded by the terminal, not downloaded from the network in the PUSH form.

In the present disclosure, verification and authentication of the authentication code may be interchangeably used.

Further, it is apparent to those skilled in the art that the terms control unit and controller used in the present disclosure may have the same meaning.

FIG. 1 illustrates a process of distributing and opening a terminal using a UICC of the related art according to an embodiment of the present disclosure (SIM card).

Referring to FIG. 1, a removable UICC, which can be inserted into and removed from the terminal, may have authentication information (international mobile subscriber identity (IMSI), K, and the like), by which the terminal can access a particular mobile communication service company network, therein and then sold. Accordingly, the removable card can be used only by the corresponding mobile network operator until the card is discarded. The UICC may have various communication applications such as a SIM, a USIM, and an ISIM therein according to the type of a mobile communication network, and also various applications such as a mobile credit card, a mobile wallet, and an electronic passport. In this case, the UICC inserted into the terminal can be managed through an OTA technology to conveniently install, modify, or remove the application within the UICC.

A mobile network operator (MNO) 100 transmits SIM information such as an IMSI or an ICCID to a SIM vendor 130 as indicated by reference numeral 101. The SIM vendor 130 manufactures a UICC by using the received SIM information and delivers the UICC to the MNO 100 as indicated by reference numeral 103. That is, the UICC is manufactured as a dedicated card for a particular mobile network operator by a request from the corresponding operator when the UICC is manufactured. Accordingly, the UICC is released after authentication information (for example, a USIM application and an IMSI or K value) for the network access by the corresponding operator is inserted into the UICC in advance.

Then, the MNO 100 places an order with a device manufacturer 150 for a terminal as indicated by reference numeral 105, and the device manufacturer 150 manufactures the terminal and delivers the terminal to the MNO 100 as indicated by reference numeral 107. The MNO 100 provides the terminal together with a UICC corresponding to ICCID information of the corresponding user to a seller as indicated by reference numeral 111. When a user 170 makes a request for subscribing to a mobile communication network to the MNO 100 as indicated by reference numeral 109, the user installs the UICC in the purchased terminal. When the user turns on a state of the terminal, the terminal is connected to an operational network, and applications are installed, modified, and removed from the UICC through an OTA technology as necessary. The user can use a network and application service of the corresponding mobile network operator by inserting the UICC into the mobile communication terminal of the user. Further, if the user changes the terminal, the user can still use authentication information, mobile communication phone numbers, and a personal phone book through a new terminal by inserting the UICC of the terminal of the related art into the new terminal.

Figure 2:
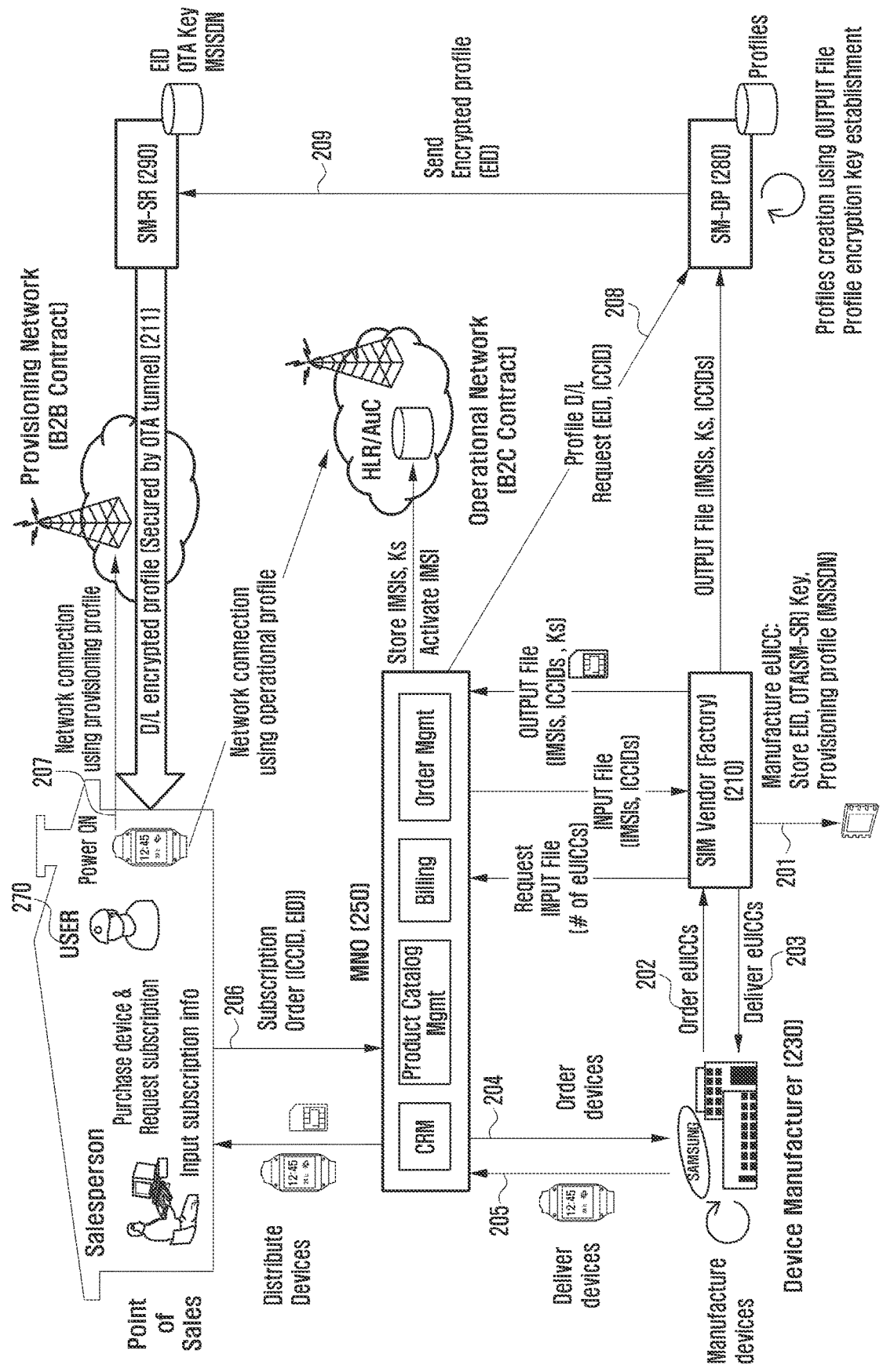
FIG. 2 illustrates a process of downloading a profile of an embedded UICC (eUICC) according to an embodiment of the present disclosure.

FIG. 2 illustrates a process of downloading a profile of an eUICC according to an embodiment of the present disclosure.

Referring to FIG. 2, an eUICC 201 may download and install the profile by using the OTA technology.

An MNO 250 may provide information on an IMSI or ICCID to a SIM vendor 210, and the SIM vendor 210 may manufacture the eUICC based on the provided information. The difference from FIG. 1 is that the manufactured eUICC is provided by a device manufacturer 230, not by the MNO 250 in FIG. 2. The eUICC may store an EID corresponding to a unique identification of each eUICC, an OTA (SM-SR) key, and a provisioning profile (mobile station integrated services digital network (MSISDN)). The device manufacturer 230 may place an order with the SIM vendor 210 for the eUICC as indicated by reference numeral 202 and receive the manufactured eUICC as indicated by reference numeral 203. The device manufacturer 230 may manufacture a terminal equipped with the received eUICC. Alternatively, the eUICC may be installed in the terminal later. The MNO 250 may place an order with the device manufacturer 230 for the terminal as indicated by reference numeral 204, and the device manufacturer 230 may supply the terminal including the eUICC in response to the order from the MNO 250 as indicated by reference numeral 205. Alternatively, the eUICC may be separately supplied later.

A user 270 may purchase the terminal and apply to subscribe to a mobile communication service to the MNO 250 as indicated by reference numeral 206. For the service subscription, the EID corresponding to the unique identification of the eUICC included in the mobile communication terminal may be a unique identification having a globally unique value. When the user 270 subscribes to the mobile communication service, the MNO 250 may receive the EID corresponding to the identification of the eUICC and the ICCID, and make a request for profile download (D/L) to an SM-DP 280 according to the corresponding information.

The SM-DP 280 may be operated directly by the MNO or may be operated by another company having a complete trust relationship with the MNO. According to a business and contract relationship, the SM-DP 280 may provide services for one or more MNOs. The SM-DP 280 may serve to generate and encrypt the profile for a user who subscribes to the corresponding MNO and transmit the encrypted profile to an SM-SR 290.

The EID and the ICCID, which are provided when the user 270 subscribes to the service, may be verified through a comparison with values stored in the eUICC when the eUICC downloads the profile later. When the verification fails, the EID and the ICCID may be used to stop installing the profile.

The SM-SR 290 is a server, which serves to manage a profile of a particular eUICC, and stably transmits the encrypted profile received from the SM-DP 280 to a corresponding terminal security module. The SM-SR 290 may serve to manage the profile, for example, activating, deactivating, or removing the profile after the profile is completely decrypted and installed in the eUICC.

When the user 270 turns on the purchased terminal, the terminal accesses a provisioning network by using a provisioning profile pre-installed in the eUICC as indicated by reference numeral 207. The SM-DP 280 may generate the profile of the corresponding EID according to a profile D/L request 208 from the MNO 250, encrypt the generated profile, and transmit the encrypted profile to the SM-SR 290 as indicated by reference numeral 209.

The SM-SR 290 may provide an operational profile to the user through the security verifying process of the user terminal as indicated by reference numeral 210, and the terminal may access the mobile communication network of the MNO 250 by using the downloaded operational profile.

Figure 3:
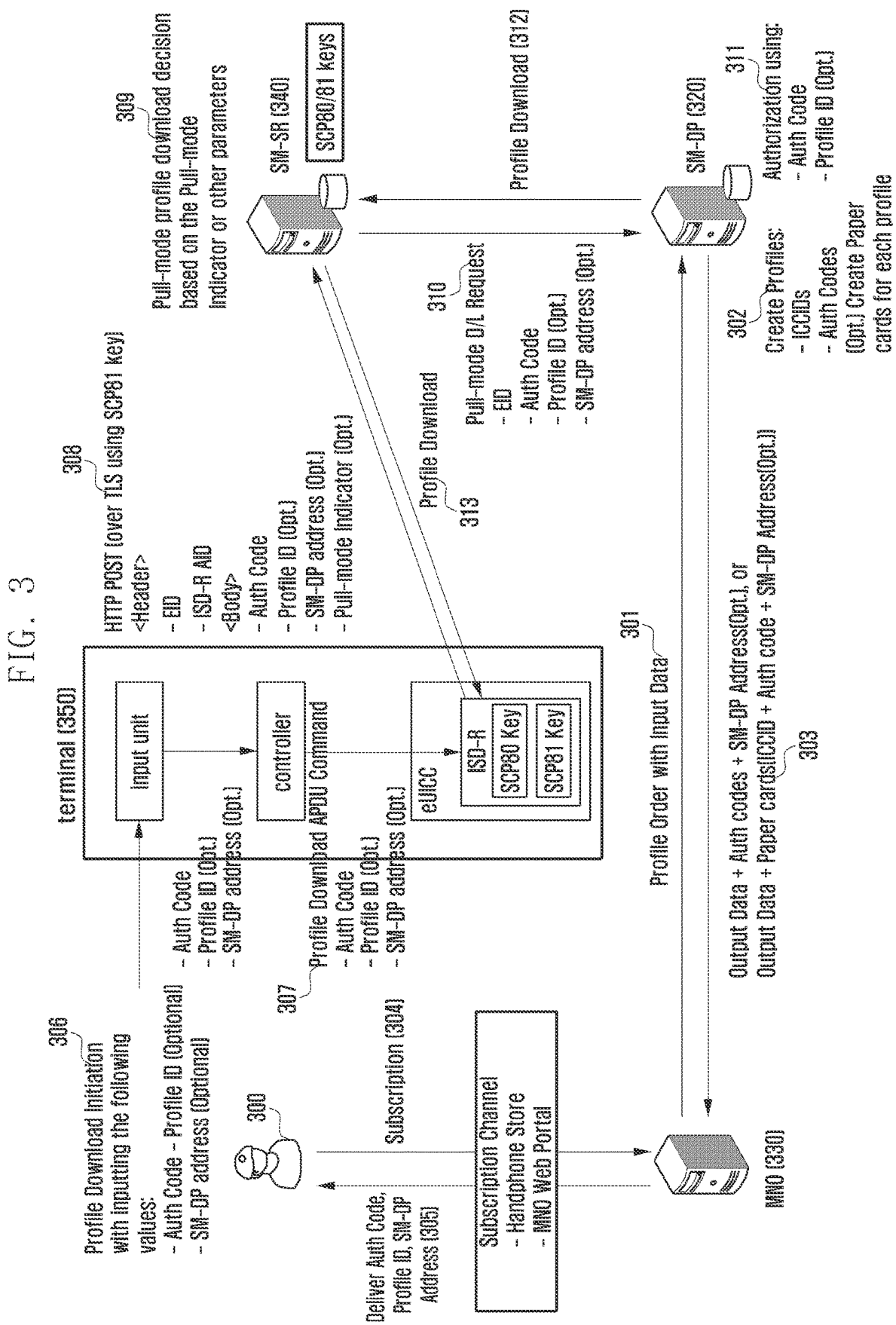
FIG. 3 illustrates a first embodiment of a profile download method initiatively by a terminal according to an embodiment of the present disclosure.

FIG. 3 illustrates a first embodiment of a profile download method initiatively by a terminal according to an embodiment of the present disclosure.

Referring to FIG. 3, an MNO 330 may first provide input data, which may include an IMSI or an ICCID, to an SM-DP 320 and make a request for generating a profile as indicated by reference numeral 301.

The SM-DP 320 may generate the profile based on the ICCID according to the request from the MNO 330 as indicated by reference numeral 302. The SM-DP 320 may generate an Auth code as a result of the generation of the profile. The Auth code is a random number generated by the SM-DP 320 and may be used for processing normal opening only when an opening request including the corresponding random number is made. Further, the Auth code may be also expressed as an authentication code and may be generated according to each ICCID in the present disclosure.

When the SM-DP 320 generates the profile and transmits output data related to the generated profile to the MNO 330, the SM-DP 320 may also transmit the Auth code. Further, the SM-DP 320 may transmit information on an address of the SM-DP as indicated by reference numeral 303. In addition, the ICCID, the Auth code, and the SM-DP address may be provided to the MNO 330 in the form of a paper card. In the present disclosure, although the ICCID, the Auth code, and the SM-DP address are described in the form of the paper card, the physical form of the result by the SM-DP 320 has no limitation and the ICCID, the Auth code, and the SM-DP address may be manufactured as various forms of results.

When the user 300 applies to subscribe to the service to the MNO 330 as indicated by reference numeral 304, the MNO 330 may transmit information on the received profile ID, Auth code, and SM-DP address to the user 300 as indicated by reference numeral 305. At this time, the information may be transmitted in the form of the paper card, and may be specified in the form of a text string, a barcode, or a quick response (QR) code in the paper card. Further, the corresponding information may be transmitted to the user after being inserted into a near field communication (NFC) tag.

In addition, according to an embodiment of the present disclosure, the paper card may be provided to a purchaser of the terminal by a seller of the terminal, but the profile ID, the SM-DP address, or the Auth code may be provided to the user, who purchases the terminal including the eUICC, in the form of the text string, the barcode, or the QR code through a website of the MNO 330.

Thereafter, the user 300 may input, into a terminal 350, information which is related to the profile including the Auth code provided for profile download initiation as indicated by reference numeral 306.

The user 300 may input, into the terminal 350, information, which is related to the profile download, including the Auth code in various methods. A detailed input method will be described with reference to FIG. 4.

Figure 4:
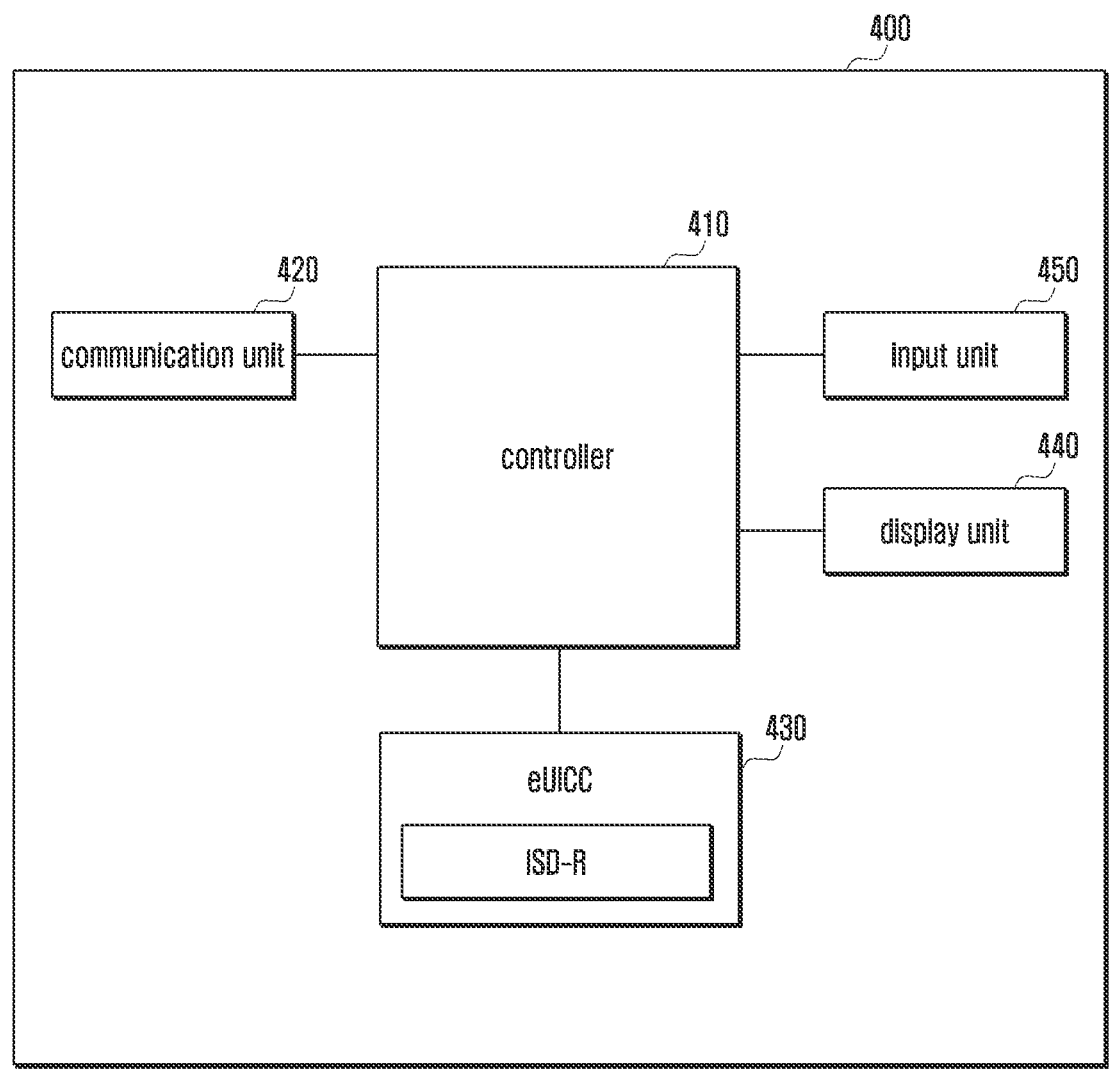
FIG. 4 is a block diagram illustrating a configuration of a terminal supporting a profile installation method according to an embodiment of the present disclosure.

FIG. 4 is a block diagram illustrating a configuration of a terminal supporting a profile installation method according to an embodiment of the present disclosure.

Referring to FIG. 4, a terminal 400 may include a controller 410, a communication unit 420, an eUICC 430, a display unit 440, and an input unit 450.

The communication unit 420 may perform data communication between the terminal 400 and an external device. Further, the communication unit 420 may operate based on a control by the controller 410 of the terminal, but the eUICC 430 may perform communication through the communication unit 420 of the terminal when communication with an external device is needed.

The eUICC 430 is a UICC chip of the terminal and may include an ISD-R therein. The ISD-R may be a control module, which decrypts an OTA message that is encrypted within the eUICC/eSIM and transmitted by the SM-RS server and performs a function of downloading, enabling, disabling, and deleting the profile.

The display unit 440 may display an operation and a state of the terminal on a display device for the user of the terminal. The display unit 440 may be implemented as a panel such as a liquid crystal display (LCD) or an active matrix organic light emitting diode (AM-OLED) and may be implemented to be wearable.

The input unit 450 of the terminal 400 may include devices, which receive various types of input signals. More specifically, according to an embodiment of the present disclosure, the input unit 450 may include an audio module, and the audio module may include a speaker, a receiver, earphones, or a microphone to receive sound information input through the microphone.

Further, according to an embodiment of the present disclosure, the input unit 450 may include a camera module, and the camera module may include an image sensor and a lens to receive a still image and a moving image input through the camera.

In addition, according to an embodiment of the present disclosure, the input unit 450 may be a touch panel, and may include a (digital) pen sensor, a key, or an ultrasonic input device to recognize a physical contact or proximity of the user.

In the present disclosure, the input unit of the terminal 350, which receives information related to the profile download by the user 300, may operate through various input methods of processing electronic signals as well as the above described input devices.

Referring back to FIG. 3, operation 306 will be described in detail.

In operation 306, the user 300 may input, into the terminal 350, information related to downloading of the profile received from the MNO 330.

A method of inputting the information related to the profile download into the terminal 350 by the user 300 will be variously configured. For example, the user may directly input the Auth code, the profile ID, or the SM-DP address in the form of text-based information by using a touch screen of the terminal 350.

Alternatively, the user may input the Auth code, the profile ID, or the SM-DP address into the terminal 350 by photographing information in the form of a barcode or a QR code through the camera module of the terminal 350.

Alternatively, the user may input the Auth code, the profile ID, or the SM-DP address into the terminal 350 in the form of an NFC tag, which can be read through a contact with an NFC module of the terminal 350, by using NFC.

Alternatively, the user may input the Auth code, the profile ID, or the SM-DP address into a device, which is linked or connected to the terminal 350. In this case, the device, which is linked or connected to the terminal 350, may be a smart phone or a wearable device. At this time, the information related to the downloading of the profile in the form of the barcode or QR code is input through a camera separately provided at the connected device, and the Auth code, the profile ID, or the SM-DP address may be input into the terminal 350 through wired/wireless communication between the corresponding device and the terminal 350.

Further, the number of terminals 350 may be plural. In this case, by an operation of each terminal, the verification of the authentication code for the profile to be stored in the eUICC may be requested by another terminal. It will be described in more detail with reference to FIG. 20.

In addition, various embodiments for inputting the Auth code, the profile ID, or the SM-DP address into the terminal 350 may be implemented, and the present disclosure is not limited to one of the above described methods. This may be an option for selecting a random method from a lot of methods of inputting the information related to the profile download into the terminal 350.

When the information related to the profile download is input into the input unit of the terminal 350, the controller of the terminal 350 may transmit commands, which make a request for downloading the profile in the form of an application protocol data unit (APDU) command to the ISD-R within the eUICC as indicated by reference numeral 307. The APDU may be a protocol for data transmission between devices, for example, between a smart card and a computer or a mobile phone.

The ISD-R of the eUICC may generate a hypertext transfer protocol (HTTP) POST message to be transmitted to the SM-SR by using at least one piece of the information related to the downloading of the profile included in the APDU commands received from the controller of the terminal, that is, the Auth code, the profile ID, or the SM-DP address, and transmit the generated HTTP POST message to the SM-SR 340 as indicated by reference numeral 308.

At this time, the generated HTTP POST message may be expressed as Table 1.

TABLE 1

HTTP POST (over TLS using SCP81 key)
<Header>
- EID
- ISD-R application identifier (AID)
<Body>
- Auth Code
- Profile ID (Opt.)
- SM-DP address (Opt.)
- Pull-mode Indicator (Opt.)

According to an embodiment of the present disclosure, the HTTP POST message may be expressed as Table 2.

TABLE 2

HTTP POST (over TLS using SCP81 key)
<Header>
- EID
- ISD-R AID
- Auth Code
- Profile ID (Opt.)
- SM-DP address (Opt.)
- Pull-mode Indicator (Opt.)

When the SM-SR 340 receives the HTTP POST message by the ISD-R within the eUICC of the terminal, it may be determined that the terminal downloads the profile initiatively as indicated by reference numeral 309.

That is, unlike the prior art in which the MNO 330 initiatively provides the profile to the terminal through the SM-SR or the SM-DP, when the terminal directly makes a request for authentication and downloads the profile, the SM-SR may recognize a pull-mode and determine pull-mode profile download. At this time, in order to indicate the pull-mode, a pull-mode indicator or a new parameter may be defined and used.

The SM-SR 340 transmits a pull-mode D/L request to the SM-DP 320 as indicated by reference numeral 310. At this time, the corresponding request message may include an EID and an Auth code, and may include a profile ID and an SM-DP address in some cases.

The SM-DP 320 having received the pull-mode D/L request may verify the terminal, which made the pull-mode D/L request, based on matching of the Auth code as indicated by reference numeral 311. When the verification is successful, the SM-DP 320 may transmit the profile to the SM-SR 340 as indicated by reference numeral 312.

Thereafter, the eUICC downloads the profile from the SM-SR 340 as indicated by reference numeral 313.

Figure 5:
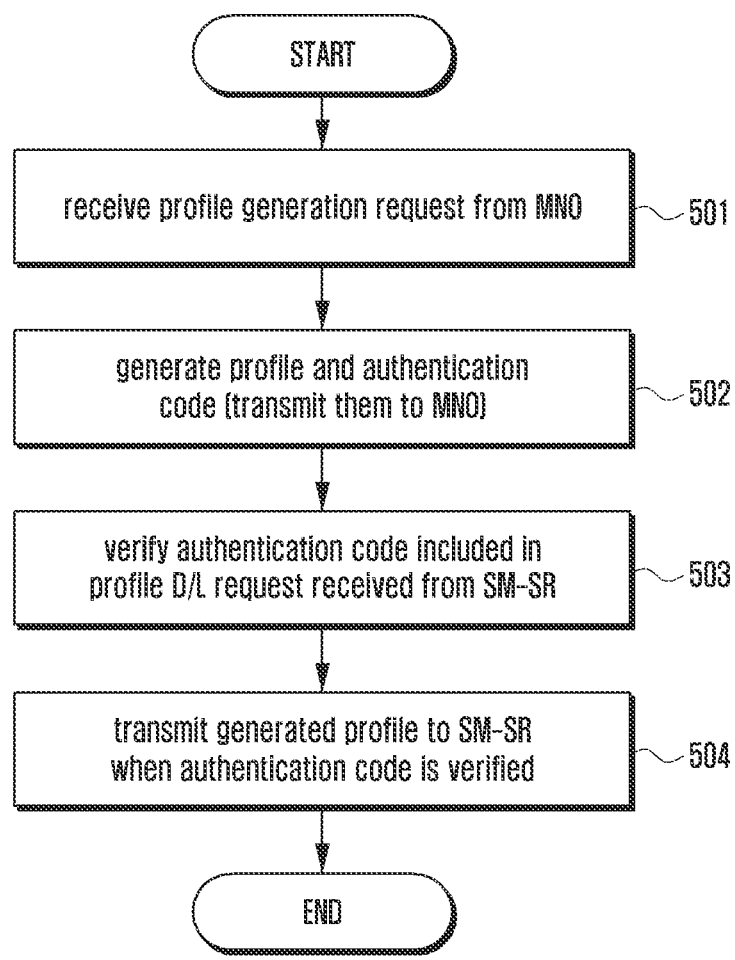
FIG. 5 is a flowchart illustrating an operation of a subscription manager data preparation (SM-DP) according to an embodiment of the present disclosure.

FIG. 5 is a flowchart illustrating an operation of the SM-DP according to a first embodiment of the present disclosure.

Referring to FIG. 5, in operation 501, the SM-DP receives a request for generating the profile from the MNO. At this time, the MNO may not provide information on an ICCID or an IMSI to the SM-DP.

In operation 502, the SM-DP may generate the profile according to the request from the MNO and generate an authentication code used for authenticating the corresponding profile. The authentication code may be an Auth code and may be generated according to each ICCID. The generated profile may be stored in the SM-DP, and the SM-DP may transmit the ICCID (or profile ID) and the authentication code to the MNO. In the present disclosure, the authentication code and the profile ID (or ICCID) may be called information related to profile download.

Thereafter, the SM-DP may receive a request for downloading the profile from the SM-SR in operation 503. The request for downloading the profile, which is transmitted to the SM-DP by the SM-SR, may be a pull-mode D/L request triggered by the terminal initiatively.

The terminal may verify the triggered profile download through a comparison between the Auth code included in the received pull-mode D/L request and the Auth code stored in the SM-DP. When the verification is successful, the SM-DP transmits the generated profile to the SM-SR in operation 504.

Figure 6:
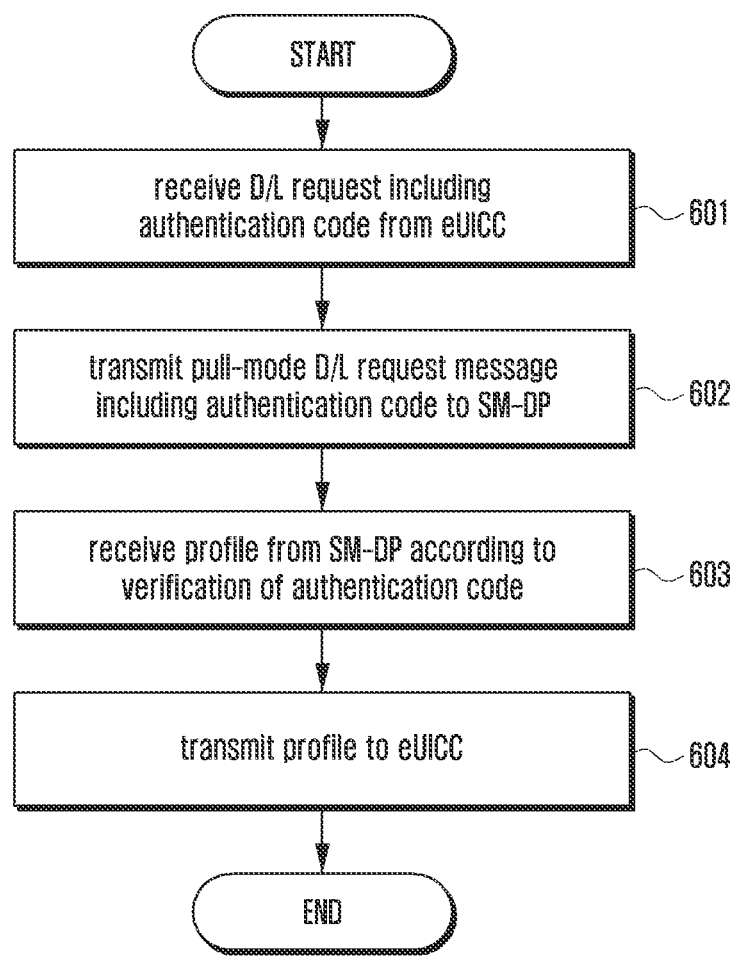
FIG. 6 is a flowchart illustrating an operation of a subscription manager secure routing (SM-SR) according to an embodiment of the present disclosure.

FIG. 6 is a flowchart illustrating an operation of the SM-SR according to the first embodiment of the present disclosure.

Referring to FIG. 6, in operation 601, the SM-SR may receive a request for downloading a profile including an Auth code from the eUICC. At this time, the received request may be in the form of the HTTP POST shown in Table 1 or Table 2.

In operation 602, the SM-SR may identify that the received request for downloading the profile is transmitted from the terminal and determine the download as pull-mode profile download. Accordingly, the SM-SR may transmit a pull-mode D/L request including the Auth code received from the eUICC to the SM-DP.

In operation 603, as the SM-DP succeed verification of the Auth code, the SM-SR may receive the profile from the SM-DP, and transmit the profile to the eUICC in operation 604.

Figure 7:
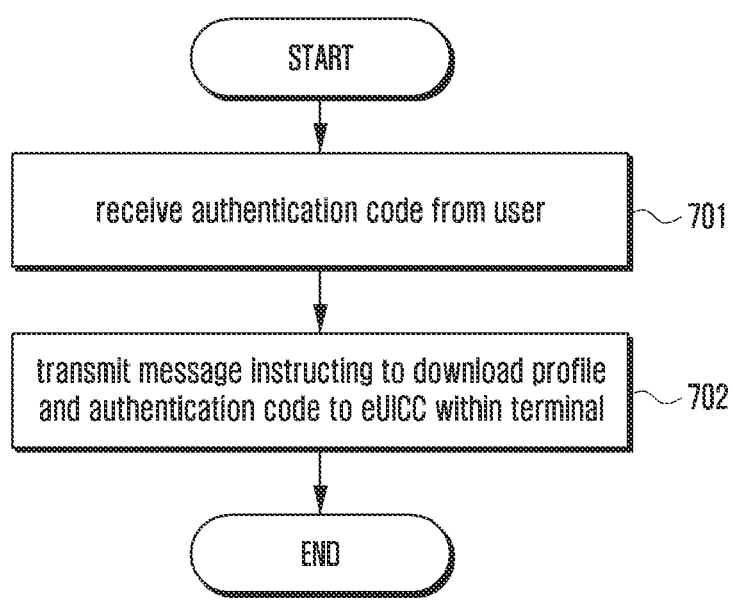
FIG. 7 is a flowchart illustrating an operation of a terminal according to an embodiment of the present disclosure.

FIG. 7 is a flowchart illustrating an operation of the terminal according to the first embodiment of the present disclosure.

Referring to FIG. 7, the terminal may receive an input of a profile ID (or ICCID) or an Auth code from the user in operation 701. In the present disclosure, a method of receiving an input of information related to the profile download from the user may be variously configured. More specifically, the user may directly input the Auth code, the profile ID, or the SM-DP address in the form of text-based information by using a touch screen.

Alternatively, the user may input the Auth code, the profile ID, or the SM-DP address into the terminal 350 by photographing information in the form of a barcode or a QR code through the camera module.

Alternatively, the user may input the Auth code, the profile ID, or the SM-DP address into the terminal 350 in the form of an NFC tag, which can be read through a contact with an NFC module of the terminal 350, by using NFC.

Alternatively, the user may input the Auth code, the profile ID, or the SM-DP address into a device, which is linked or connected to the terminal. In this case, the device, which is linked or connected to the terminal, may be a smart phone or a wearable device. At this time, the information related to the downloading of the profile in the form of the barcode or QR code is input through a camera separately provided at the connected device, and the Auth code, the profile ID, or the SM-DP address may be input into the terminal 350 through wired/wireless communication between the corresponding device and the terminal.

In addition, various embodiments for inputting the Auth code, the profile ID, or the SM-DP address into the terminal may be implemented, and the present disclosure is not limited to one of the above described methods.

In operation 702, the controller of the terminal may transmit an APDU command that instructs to download the profile to the eUICC within the terminal, and the corresponding command may include the profile ID or the Auth code input into the terminal.

Figure 8:
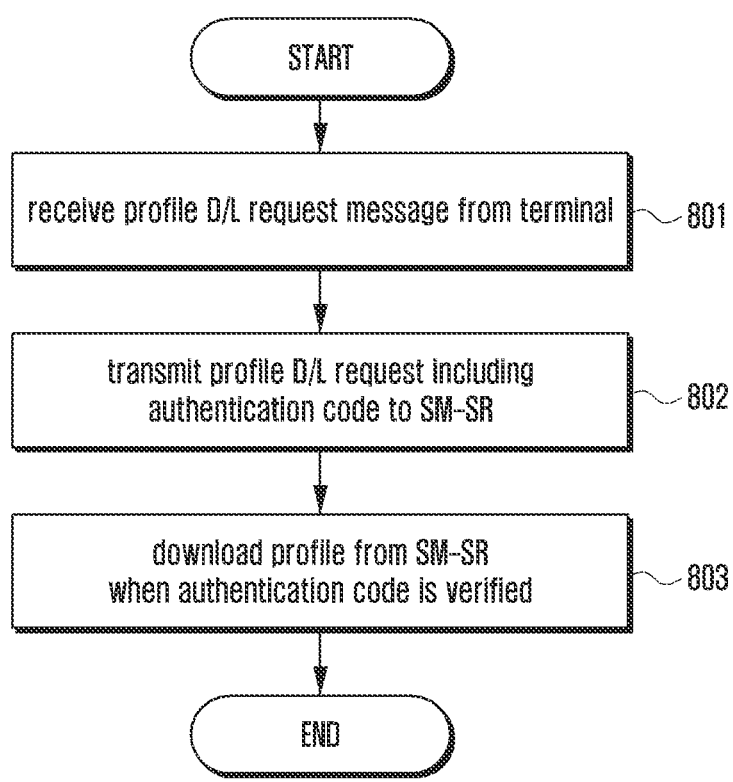
FIG. 8 is a flowchart illustrating an operation of an eUICC within a terminal according to an embodiment of the present disclosure.

FIG. 8 is a flowchart illustrating an operation of the eUICC within the terminal according to the first embodiment of the present disclosure.

Referring to FIG. 8, the eUICC within the terminal may receive the APDU command that instructs to download the profile from the controller of the terminal. At this time, the corresponding command may include the profile ID or the Auth code input into the terminal in operation 801. In operation 802, the eUICC may make a request for downloading the profile including the Auth code and the profile ID to the SM-SR. At this time, the message transmitted by the eUICC may be in the form of Table 1 or Table 2 as described above.

When the transmitted Auth code is completely verified, the eUICC downloads the profile from the SM-SR in operation 803.

Figure 9:
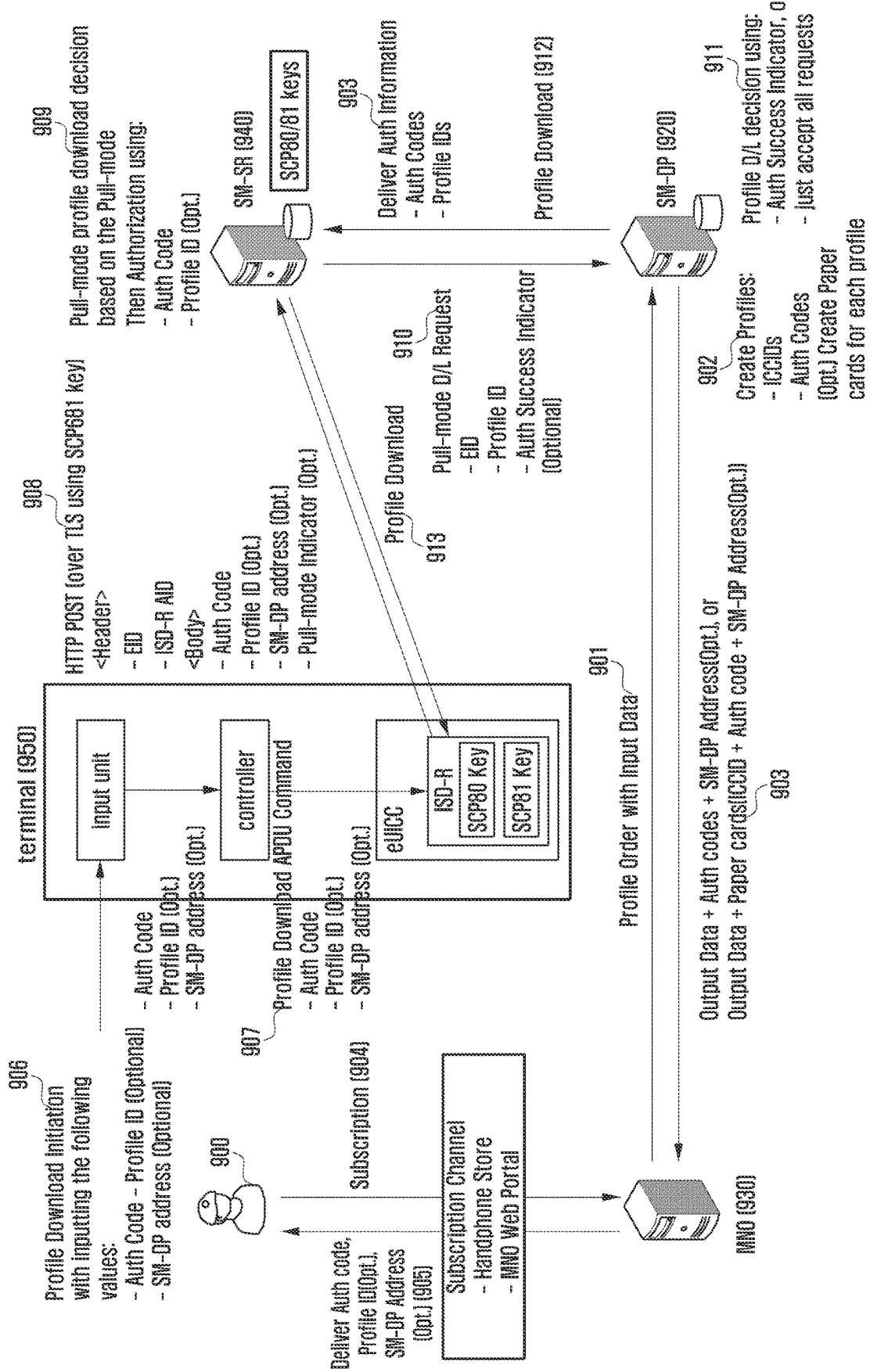
FIG. 9 illustrates a second embodiment of a profile download method initiatively by a terminal according to an embodiment of the present disclosure.

FIG. 9 illustrates a second embodiment of a profile download method initiatively by a terminal according to the present disclosure.

Referring to FIG. 9, an MNO 930 may first provide input data, which may include an IMSI or an ICCID, to an SM-DP 920 and make a request for generating a profile as indicated by reference numeral 901.

The SM-DP 920 may generate the profile based on the ICCID according to the request from the MNO 930 as indicated by reference numeral 902. The SM-DP 920 may generate an Auth code as a result of the generation of the profile. The Auth code is a random number generated by the SM-DP 920 and may be used for processing normal opening only when an opening request including the corresponding random number is made. Further, the Auth code may be also expressed as an authentication code and may be generated according to each ICCID in the present disclosure.

When the SM-DP 920 generates the profile and transmits output data related to the generated profile to the MNO 930, the SM-DP 920 may also transmit the Auth code. Further, the SM-DP 920 may also transmit information on an address of the SM-DP. At this time, in the second embodiment of the profile download method according to the present disclosure, when the SM-DP 920 transmit the profile ID (or ICCID) and the Auth code to the MNO, the SM-DP 920 may transmit the same information to the SM-SR 940 as indicated by reference numeral 903.

When information related to the profile is transmitted to the MNO 930, the ICCID, the Auth code, and the SM-DP address may be provided to the MNO 930 in the form of a paper card. In the present disclosure, although the ICCID, the Auth code, and the SM-DP address are described in the form of the paper card, the physical form of the result by the SM-DP 920 has no limitation and the ICCID, the Auth code, and the SM-DP address may be manufactured as various forms of results.

When the user 900 applies to subscribe to the service to the MNO 930 as indicated by reference numeral 904, the MNO 930 may transmit information on the received profile ID, Auth code, and SM-DP address to the user 900 as indicated by reference numeral 905. At this time, the information may be transmitted in the form of the paper card, and may be specified in the form of a text string, a barcode, or a QR code in the paper card. Further, the corresponding information may be transmitted to the user after inserted into an NFC tag.

In addition, according to an embodiment of the present disclosure, the paper card may be provided to a purchaser of the terminal by a seller of the terminal, but the profile ID, the SM-DP address, or the Auth code may be provided to the user, who purchases the terminal including the eUICC, in the form of the text string, the barcode, or the QR code through a website of the MNO 930.

Thereafter, the user 900 may input, into a terminal 950, information which is related to the profile including the Auth code provided for profile download initiation as indicated by reference numeral 906.

A method of inputting the information related to the profile download into the terminal 950 by the user 900 will be variously configured. For example, the user may directly input the Auth code, the profile ID, or the SM-DP address in the form of text-based information by using a touch screen.

Alternatively, the user may input the Auth code, the profile ID, or the SM-DP address into the terminal 950 by photographing information in the form of a barcode or a QR code through the camera module.

Alternatively, the user may input the Auth code, the profile ID, or the SM-DP address into the terminal 950 in the form of an NFC tag, which can be read through a contact with an NFC module of the terminal 950, by using NFC.

Alternatively, the user may input the Auth code, the profile ID, or the SM-DP address into a device, which is linked or connected to the terminal 950. In this case, the device, which is linked or connected to the terminal 950, may be a smart phone or a wearable device. At this time, the information related to the downloading of the profile in the form of the barcode or QR code is input through a camera separately provided at the connected device, and the Auth code, the profile ID, or the SM-DP address may be input into the terminal 950 through wired/wireless communication between the corresponding device and the terminal 950.

In addition, various embodiments for inputting the Auth code, the profile ID, or the SM-DP address into the terminal 950 may be implemented, and the present disclosure is not limited to one of the above described methods. This may be an option for selecting a random method from the many methods of inputting the information related to the profile download into the terminal 950.

When the information related to the profile download is input into the input unit of the terminal 950, the controller of the terminal 950 may transmit commands, which make a request for downloading the profile in the form of an APDU command to the ISD-R within the eUICC as indicated by reference numeral 907. The APDU may be a protocol for data transmission between devices, for example, between a smart card and a computer or a mobile phone.

The ISD-R of the eUICC may generate an HTTP POST message to be transmitted to the SM-SR by using at least one piece of the information related to the downloading of the profile included in the APDU commands received from the controller of the terminal, that is, the Auth code, the profile ID, or the SM-DP address, and transmit the generated HTTP POST message to the SM-SR 940 as indicated by reference numeral 908. At this time, the generated HTTP POST message may be expressed as shown in Table 1 or Table 2.

When the SM-SR 940 receives the HTTP POST message by the ISD-R within the eUICC of the terminal, it may be determined that the terminal downloads the profile initiatively as indicated by reference numeral 909.

That is, unlike the prior art in which the MNO 930 initiatively provides the profile to the terminal through the SM-SR or the SM-DP, when the terminal directly makes a request for authentication and downloads the profile, the SM-SR may recognize a pull-mode and determine pull-mode profile download. At this time, in order to indicate the pull-mode, a pull-mode indicator or a new parameter may be defined and used.

When the SM-SR 940 determines the pull-mode profile D/L, the SM-SR 940 may verify the Auth code received from the eUICC by comparing the pre-stored Auth code and the Auth code received from the eUICC.

When the verification is successful, the SM-SR 940 transmits a pull-mode D/L request, which makes a request for transmitting the profile, to the SM-DP 920 as indicated by reference numeral 909. At this time, the pull-mode D/L request message transmitted by the SM-SR 940 may include an EID and a profile ID, and also an Auth success indicator indicating the success of the verification of the authentication code.

The SM-DP 920 may determine to download the profile by identifying the Auth success indicator included in the pull-mode D/L request message received from the SM-SR as indicated by reference numeral 911. The SM-DP 920 may transmit the profile to the SM-SR 940 as indicated by reference 912, and the SM-SR 940 may transmit the profile received from the eUICC as indicated by reference numeral 913.

Figure 10:
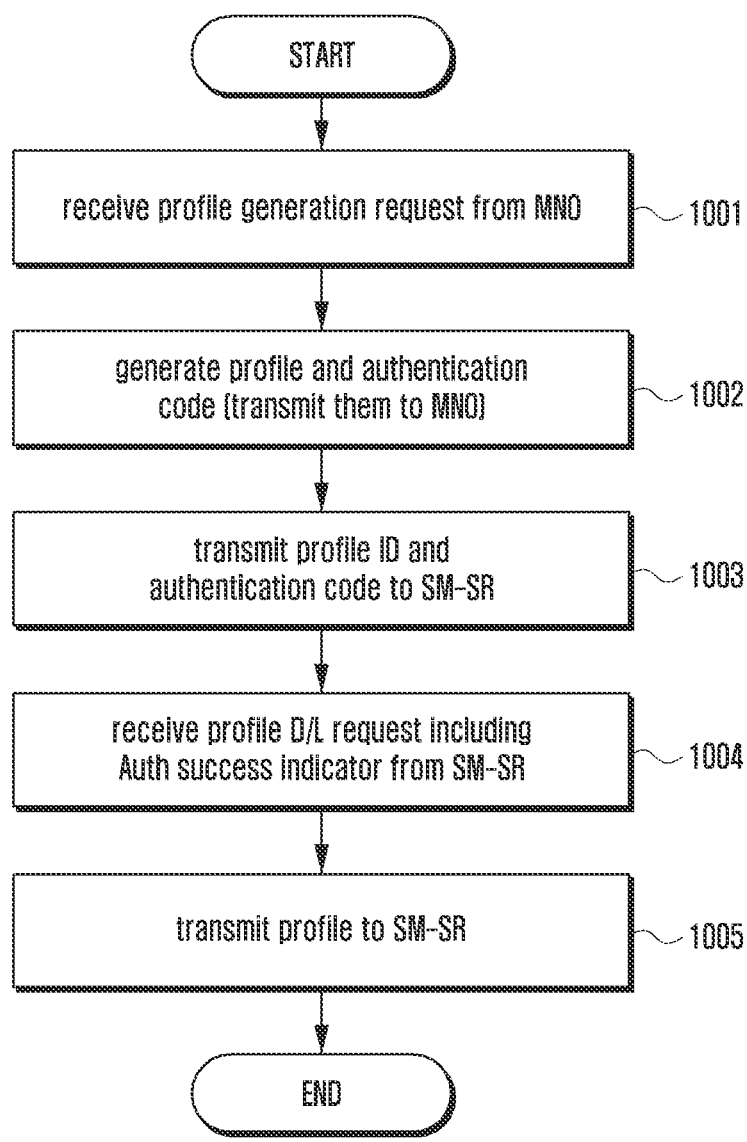
FIG. 10 is a flowchart illustrating an operation of an SM-DP according to an embodiment of the present disclosure.

FIG. 10 is a flowchart illustrating an operation of the SM-DP according to the second embodiment of the present disclosure.

Referring to FIG. 10, in operation 1001, the SM-DP receives a request for generating a profile from the MNO. At this time, the MNO may not provide information on an ICCID or an IMSI to the SM-DP. In operation 1002, the SM-DP may generate the profile according to the request from the MNO and generate an Auth code used for authenticating the corresponding profile. The authentication code may be an Auth code and may be generated according to each ICCID. The generated profile may be stored in the SM-DP, and the SM-DP may transmit the ICCID (or profile ID) and the authentication code to the MNO. In the present disclosure, the authentication code and the profile ID (or ICCID) may be called information related to profile download.

In operation 1003, the SM-DP may transmit the profile ID (or ICCID) and the Auth code to the SM-SR. In operation 1004, the SM-DP may receive a pull-mode D/L request, which makes a request for transmitting the profile of the SM-DP, from the SM-SR. At this time, the pull-mode D/L request transmitted by the SM-SR may include an EID and a profile ID, and also an Auth success indicator indicating the success of the verification of the authentication code.

In operation 1005, the SM-DP determines to download the profile and transmits the profile to the SM-SR.

Figure 11:
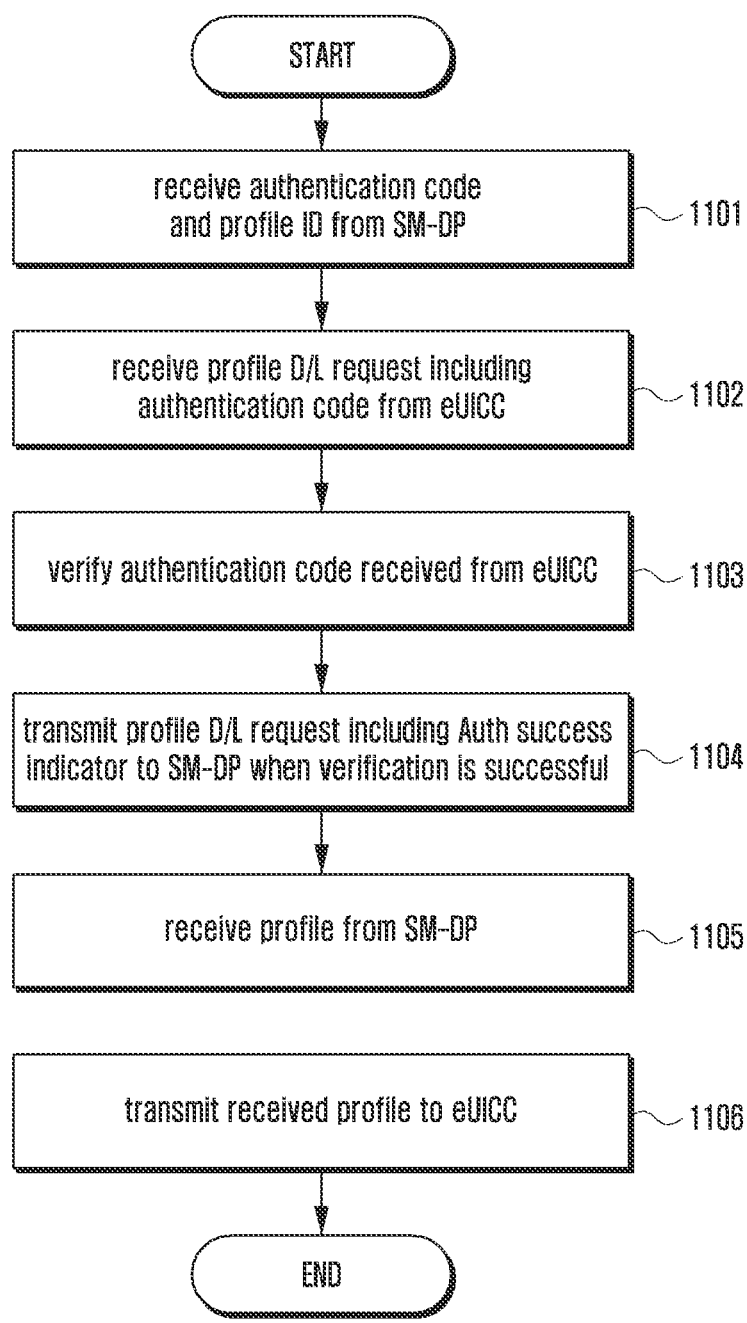
FIG. 11 is a flowchart illustrating an operation of an SM-SR according to an embodiment of the present disclosure.

FIG. 11 is a flowchart illustrating an operation of the SM-SR according to the second embodiment of the present disclosure.

Referring to FIG. 11, in operation 1101, the SM-SR receives a profile ID (or ICCID) and an Auth code from the SM-DP. In operation 1102, the SM-SR receives an HTTP POST message including at least one of an Auth code, a profile ID, and an SM-DP address from the ISD-R of the eUICC. The HTTP POST message may be a profile download request for the download initiatively by the terminal.

When the SM-SR receives the HTTP POST message including at least one of the Auth code, the profile ID, and the SM-DP address from the ISD-R of the eUICC, the SM-SR may determine pull-mode profile D/L and verify the Auth code received from the eUICC by comparing the pre-stored Auth code and the Auth code received from the eUICC in operation 1103.

When the verification is successful, the SM-SR transmits a pull-mode D/L request, which makes a request for transmitting the profile, to the SM-DP in operation 1104. At this time, the pull-mode D/L request message transmitted by the SM-SR may include an EID and a profile ID, and also an Auth success indicator indicating the success of the verification of the authentication code.

Thereafter, the SM-SR may receive the profile from the SM-DP in operation 1105, and transmit the received profile to the eUICC in operation 1106.

Unlike the case where the verification of the Auth code is performed by the SM-DP (first embodiment), the verification of the Auth code is performed by the SM-SR in the second embodiment of the present disclosure, but the operations of the terminal and the eUICC are equal in the first and second embodiments. Accordingly, detailed descriptions of the operations of the terminal and the eUICC according to the second embodiment of the present disclosure are omitted since the same descriptions have been made in FIGS. 7 and 8.

Figure 12:
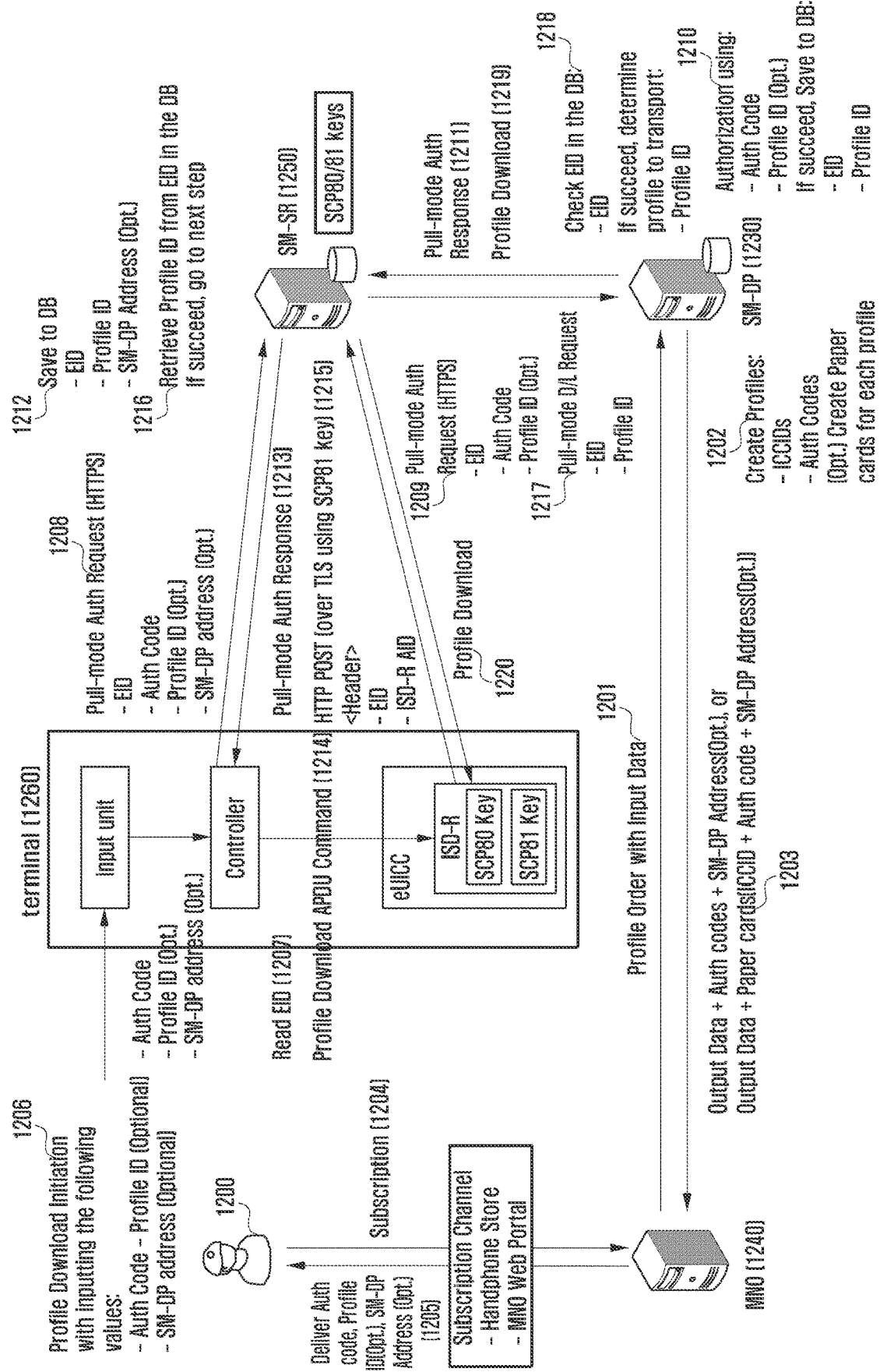
FIG. 12 illustrates a third embodiment of a profile download method initiatively by a terminal according to an embodiment of the present disclosure.

FIG. 12 illustrates a third embodiment of a profile download method initiatively by a terminal according to the present disclosure.

Referring to FIG. 12, an MNO 1240 may first make a request for generating a profile without providing particular information to an SM-DP 1230 as indicated by reference numeral 1201.

The SM-DP 1230 may generate the profile based on an ICCID according to the request from the MNO 1240 as indicated by reference numeral 1202. The SM-DP 1230 may generate an Auth code as a result of the generation of the profile. The Auth code is a random number generated by the SM-DP 1230 and may be used for processing normal opening only when an opening request including the corresponding random number is made. Further, the Auth code may be also expressed as an authentication code and may be generated according to each ICCID in the present disclosure.

When the SM-DP 1230 generates the profile and transmits output data related to the generated profile to the MNO 1240, the SM-DP 1320 may also transmit the Auth code. Further, the SM-DP 1230 may transmit information on an address of the SM-DP.

When the SM-DP 1230 transmits information related to the profile to the MNO 1240, the SM-DP 1230 may provide the Auth code and the SM-DP address to the MNO 1240 in the form of a paper card as indicated by reference numeral 1203. In the present disclosure, although the ICCID, the Auth code, and the SM-DP address are described in the form of the paper card, the physical form of the result by the SM-DP 1230 has no limitation and the ICCID, the Auth code, and the SM-DP address may be manufactured as various forms of results.

When the user 1200 applies to subscribe to the service to the MNO 1240 as indicated by reference numeral 1204, the MNO 1240 may transmit information on the profile ID, Auth code, and SM-DP address received from the SM-DP 1230 to the user 1200 as indicated by reference numeral 1205. At this time, the information may be transmitted in the form of the paper card, and may be specified in the form of a text string, a barcode, or a QR code in the paper card. Further, the corresponding information may be transmitted to the user after inserted into an NFC tag.

In addition, according to an embodiment of the present disclosure, the paper card may be provided to a purchaser of the terminal by a seller of the terminal, but the profile ID, the SM-DP address, or the Auth code may be provided to the user, who purchases the terminal including the eUICC, in the form of the text string, the barcode, or the QR code through a website of the MNO 1240.

Thereafter, the user 1200 may input, into a terminal 1260, information which is related to the profile including the Auth code provided for profile download initiation as indicated by reference numeral 1206.

A method of inputting the information related to the profile download into the terminal 1260 by the user 1200 will be variously configured. For example, the user may directly input the Auth code, the profile ID, or the SM-DP address in the form of text-based information by using a touch screen.

Alternatively, the user may input the Auth code, the profile ID, or the SM-DP address into the terminal 1260 by photographing information in the form of a barcode or a QR code through the camera module of the terminal 1260.

Alternatively, the user may input the Auth code, the profile ID, or the SM-DP address into the terminal 1260 in the form of an NFC tag, which can be read through a contact with an NFC module of the terminal 1260, by using NFC.

Alternatively, the user may input the Auth code, the profile ID, or the SM-DP address into a device, which is linked or connected to the terminal 1260. In this case, the device, which is linked or connected to the terminal 1260, may be a smart phone or a wearable device. At this time, the information related to the downloading of the profile in the form of the barcode or QR code is input through a camera separately provided at the connected device, and the Auth code, the profile ID, or the SM-DP address may be input into the terminal 1260 through wired/wireless communication between the corresponding device and the terminal 1260.

In addition, various embodiments for inputting the Auth code, the profile ID, or the SM-DP address into the terminal 1260 may be implemented, and the present disclosure is not limited to one of the above described methods. This may be an option for selecting a random method from the many methods of inputting the information related to the profile download into the terminal 1260.

In the profile download method performed by the terminal according to the third embodiment of the present disclosure, the controller of the terminal, not the eUICC, directly transmits the verification of the authentication code to the SM-SR 1250. When information related to profile download including the Auth code is input into the terminal, the controller of the terminal may read an EID corresponding to an identification of the eUICC as indicated by reference numeral 1207, and generate an HTTP secure (HTTPS) type message, which makes a request for verifying the authentication code initiatively by the terminal and transmit the generated HTTPS type message to the SM-SR 1250 as indicated by reference numeral 1208. At this time, a pull-mode Auth request transmitted to the SM-SR 1250 may include the EID of the eUICC and the Auth code, and also a profile ID and an SM-DP address in some cases.

When the SM-SR 1250 receives the request for verifying the authentication code from the controller of the terminal, the SM-SR 1250 may transmit the pull-mode Auth request to the SM-DP 1230. The pull-mode Auth request transmitted to the SM-DP 1230 may include the EID, the Auth code, and the profile ID as indicated by reference numeral 1209.

The SM-DP 1230 may verify the authentication code of the terminal, which makes a request for downloading the profile, by using the Auth code and the profile ID included in the received pull-mode Auth request as indicated by reference numeral 1210. When the verification is successful, the SM-DP 1230 may store the successfully verified EID of the EUICC and profile ID in a database (DB).

Thereafter, the SM-DP 1230 may transmit a pull-mode Auth response indicating the success of the verification of the authentication code to the SM-SR 1250 in response to the pull-mode Auth request as indicated by reference numeral 1211, and the SM-SR 1250 may store the successfully authenticated EID of the eUICC, profile ID, and SM-DP address in the DB as indicated by reference numeral 1212.

Subsequently, the SM-SR 1250 may transmit the pull-mode Auth response to the controller of the terminal as indicated by reference numeral 1213.

When the controller of the terminal receives the pull-mode Auth response indicating the success of the verification of the authentication code, the controller of the terminal may transmit commands, which make a request for downloading the profile in the form of an APDU command, to the ISD-R within the eUICC as indicated by reference numeral 1214. The APDU may be a protocol for data transmission between devices, for example, between a smart card and a computer or a mobile phone.

When the ISD-R of the eUICC receives the APDU command from the controller of the terminal, the ISD-R of the eUICC may generate an HTTP POST message as shown in Table 3 below to be transmitted to the SM-SR, and transmit the generated HTTP POST message to the SM-SR 1250 as indicated by reference numeral 1215.

TABLE 3

HTTP POST (over TLS using SCP81 key)
<Header>
- EID
- ISD-R AID

The SM-SR 1250 having received the HTTP POST message may determine whether the corresponding EID matches the EID stored in the DB as indicated by reference numeral 1216, and transmit the pull-mode D/L request to the SM-DP 1230 as indicated by reference numeral 1217. At this time, the pull-mode D/L request transmitted to the SM-DP 1230 may include an EID of the eUICC and a profile ID.

The SM-DP 1230 may determine whether the EID included in the received pull-mode D/L request matches the EID stored in the DB. When they match each other, the SM-DP 1230 determines to download the profile as indicated by reference numeral 1218.

Thereafter, the SM-DP 1230 transmits the corresponding profile to the SM-SR 1250 as indicated reference numeral 1219, and the SM-SR 1250 transmits the profile to the eUICC as indicated by reference numeral 1220.

Figure 13:
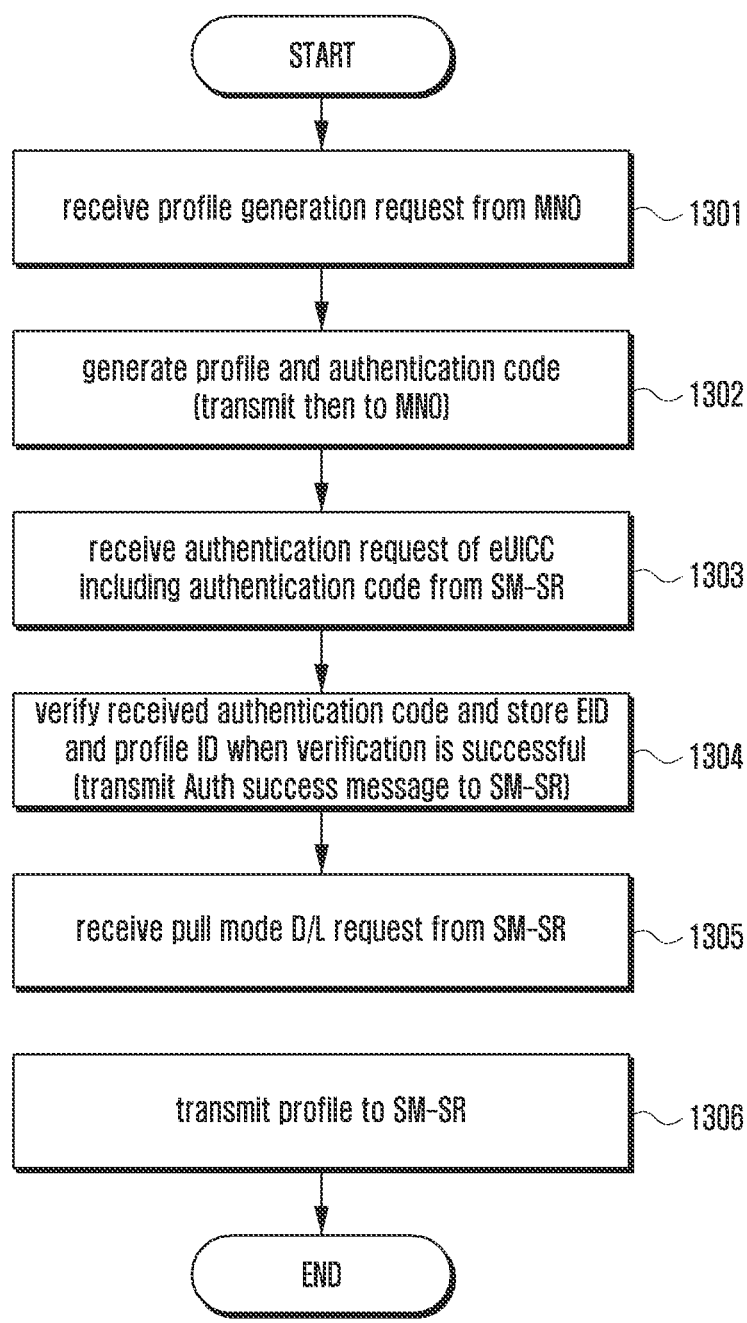
FIG. 13 is a flowchart illustrating an operation of an SM-DP according to an embodiment of the present disclosure.

FIG. 13 is a flowchart illustrating an operation of the SM-DP according to the third embodiment of the present disclosure.

Referring to FIG. 13, in operation 1301, the SM-DP receives a request for generating a profile from the MNO. At this time, the MNO may not provide information on an ICCID or an IMSI to the SM-DP. In operation 1302, the SM-DP may generate the profile according to the request from the MNO and generate an authentication code used for authenticating the corresponding profile. The authentication code may be an Auth code and may be generated according to each ICCID. The generated profile may be stored in the SM-DP, and the SM-DP may transmit the ICCID (or profile ID) and the authentication code to the MNO. In the present disclosure, the authentication code and the profile ID (or ICCID) may be called information related to profile download.

In operation 1303, the SM-DP receives an authentication request including an authentication (Auth) code of the eUICC from the SM-SR. The SM-DP verifies the corresponding authentication (Auth) code, and, when the verification is successful, store the successfully verified EID and profile ID in the DB in operation 1304.

Subsequently, the SM-DP may transmit a message indicating the success of the verification of the authentication code to the SM-SR. In operation 1305, the SM-DP receives a pull-mode D/L request for download initiatively by the terminal from the SM-SR. The corresponding request may include the EID and the profile ID. The SM-DP determines whether the received EID matches the EID stored in the DB. When they match each other, the SM-DP may transmit the corresponding profile to the SM-SR in operation 1306.

Figure 14:
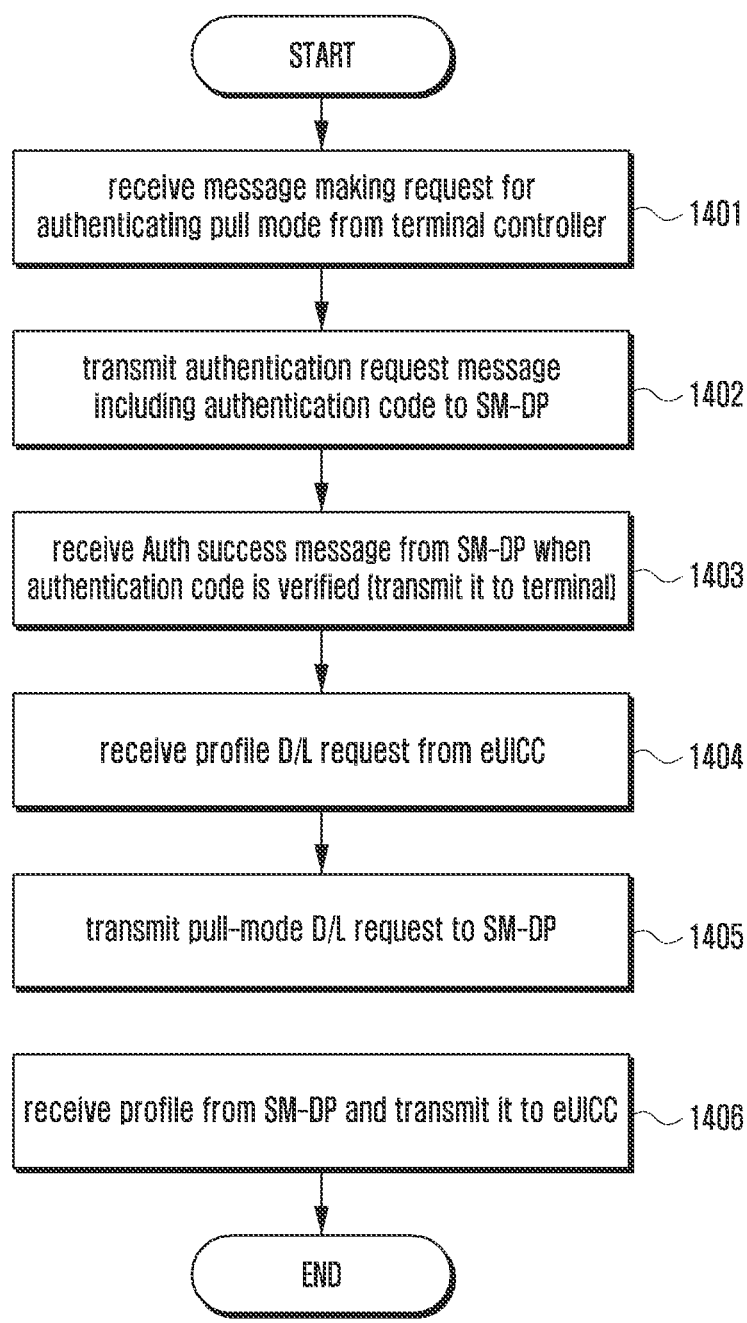
FIG. 14 is a flowchart illustrating an operation of an SM-SR according to an embodiment of the present disclosure.

FIG. 14 is a flowchart illustrating an operation of the SM-SR according to the third embodiment of the present disclosure.

Referring to FIG. 14, the SM-SR may receive a pull-mode Auth request from the controller of the terminal in operation 1401. The received pull-mode Auth request may include an EID of the eUICC within the terminal and an Auth code, and also a profile ID and an SM-DP address in some cases.

In operation 1402, the SM-SR may transmit a pull-mode Auth request, which makes a request for verifying the Auth code received from the controller of the terminal, to the SM-DP. The pull-mode Auth request transmitted to the SM-DP may include the EID, the Auth code, and the profile ID.

When the SM-DP successfully performs the verification, the SM-SR may receive a pull-mode Auth response indicating the success of the verification of the authentication code in response to the pull-mode Auth request from the SM-DP in operation 1403. The SM-SR may store the EID of the eUICC of which the authentication code is successfully verified, the profile ID, and the SM-DP address in the DB, and transmit a pull-mode Auth response indicating the success of the verification to the controller of the terminal.

The SM-SR may receive a profile D/L request from the eUICC and identify whether the EID of the corresponding eUICC matches the EID stored in the DB in operation 1404, and may transmit the pull mode D/L request to the SM-DP to make a request for downloading the profile in operation 1405.

When the SM-DP transmits the corresponding profile, the SM-SR may receive the profile and transmit the received profile to the eUICC in operation 1406.

Figure 15:
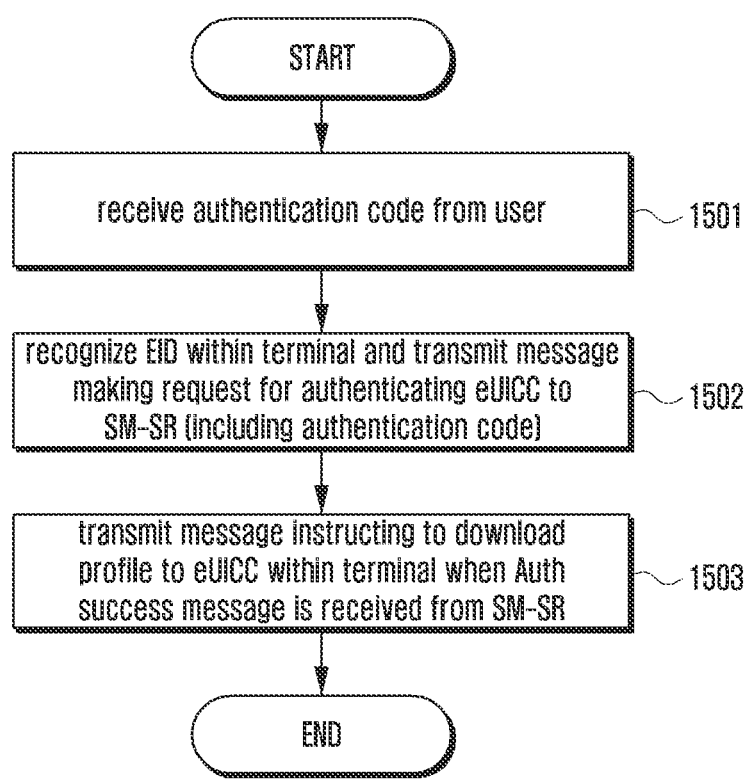
FIG. 15 is a flowchart illustrating an operation of a terminal according to an embodiment of the present disclosure.

FIG. 15 is a flowchart illustrating an operation of the terminal according to the third embodiment of the present disclosure.

Referring to FIG. 15, the terminal may receive an input of a profile ID (or ICCID) or an authentication (Auth) code from the user in operation 1501. In the present disclosure, a method of receiving an input of information related to the profile download from the user may be variously configured. More specifically, the user may directly input the Auth code, the profile ID, or the SM-DP address in the form of text-based information by using a touch screen.

Alternatively, the user may input the Auth code, the profile ID, or the SM-DP address into the terminal 350 by photographing information in the form of a barcode or a QR code through the camera module.

Alternatively, the user may input the Auth code, the profile ID, or the SM-DP address into the terminal in the form of an NFC tag, which can be read through a contact with an NFC module of the terminal 350, by using NFC.

Alternatively, the user may input the Auth code, the profile ID, or the SM-DP address into a device, which is linked or connected to the terminal. In this case, the device, which is linked or connected to the terminal, may be a smart phone or a wearable device. At this time, the information related to the downloading of the profile in the form of the barcode or QR code is input through a camera separately provided at the connected device, and the Auth code, the profile ID, or the SM-DP address may be input into the terminal through wired/wireless communication between the corresponding device and the terminal.

In addition, various embodiments for inputting the Auth code, the profile ID, or the SM-DP address into the terminal may be implemented, and the present disclosure is not limited to one of the above described methods.

In operation 1502, the terminal may recognize an EID corresponding to an identification of the eUICC within the terminal and transmit a message, which makes a request for authenticating the corresponding eUICC, to the SM-SR. At this time, the message, which makes the request for verifying the authentication code, may include information on the input Auth code, profile ID, and EID.

In operation 1503, the terminal may receive an authentication success message indicating the success of the verification of the authentication code from the SM-SR and, accordingly, transmit a message (APDU command) instructing to download the profile to the eUICC within the terminal.

Figure 16:
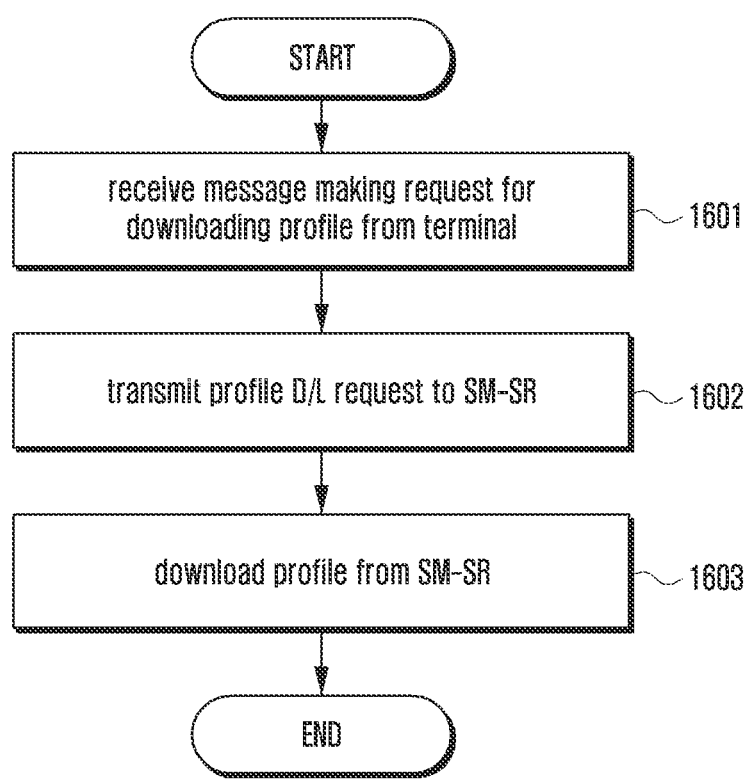
FIG. 16 is a flowchart illustrating an operation of an eUICC within a terminal according to an embodiment of the present disclosure.

FIG. 16 is a flowchart illustrating an operation of the eUICC within the terminal according to the third embodiment of the present disclosure.

Referring to FIG. 16, according to the third embodiment of the present disclosure, since the controller of the terminal makes a request for verifying the authentication code without separate verification of the authentication code by the eUICC, the eUICC receives a message, which makes a request for downloading the profile, from the controller of the terminal in operation 1601.

In this case, the Auth code is verified by the controller of the terminal, so that the eUICC transmits a pull-mode D/L request to the SM-SR in operation 1602. At this time, the transmitted request may include the content in Table 3.

In operation 1603, the eUICC may download the profile from the SM-SR.

Figure 17:
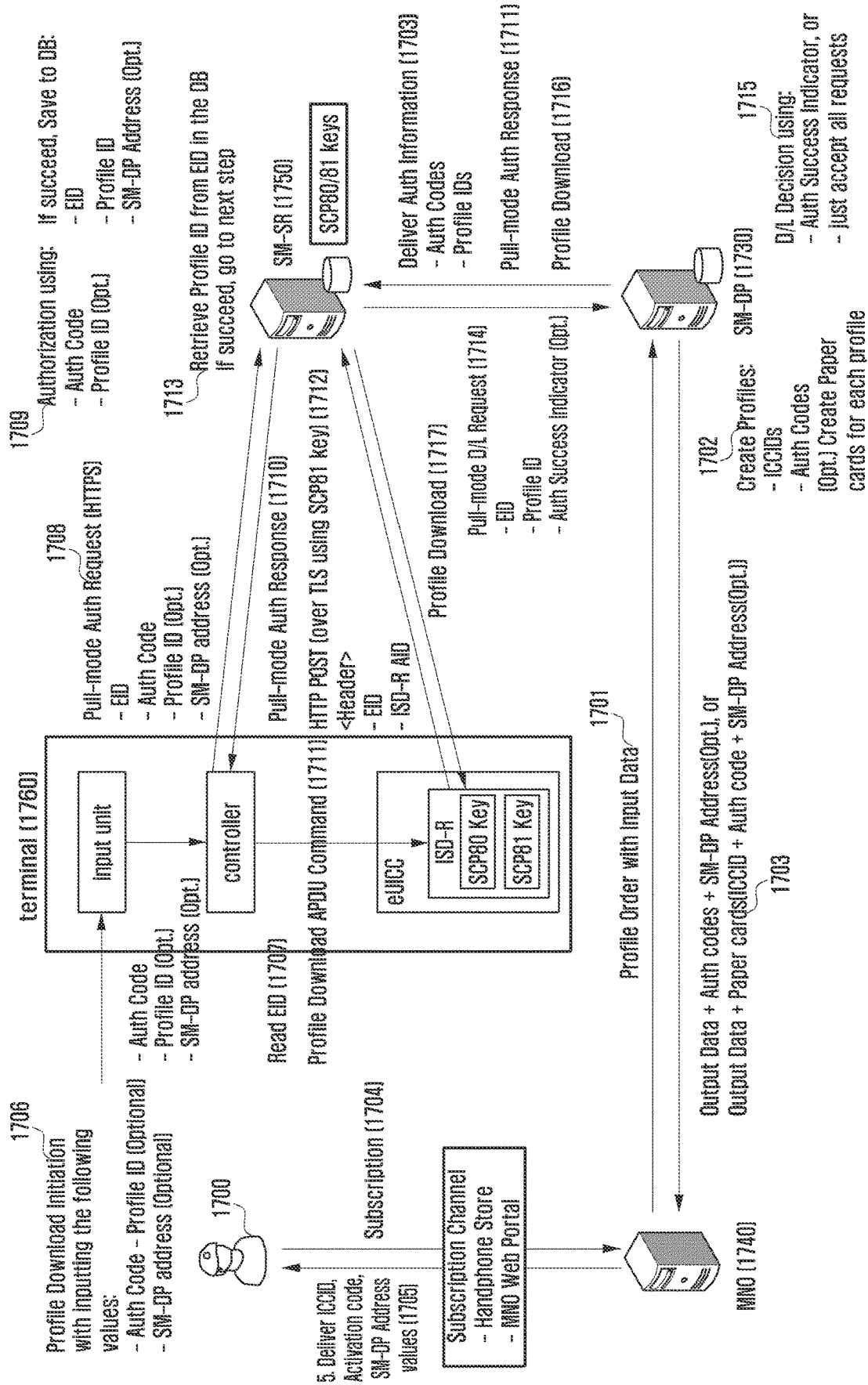
FIG. 17 illustrates a fourth embodiment of a profile download method initiatively by a terminal according to an embodiment of the present disclosure.

FIG. 17 illustrates a fourth embodiment of a profile download method initiatively by a terminal according to a fourth embodiment of the present disclosure.

Referring to FIG. 17, an MNO 1740 may first make a request for generating a profile without providing particular information to an SM-DP 1730 as indicated by reference numeral 1701.

The SM-DP 1730 may generate the profile based on an ICCID according to the request from the MNO 1740 as indicated by reference numeral 1702. The SM-DP 1730 may generate an Auth code as a result of the generation of the profile. The Auth code is a random number generated by the SM-DP 1730 and may be used for processing normal opening only when an opening request including the corresponding random number is made. Further, the Auth code may be also expressed as an authentication code and may be generated according to each ICCID in the present disclosure.

When the SM-DP 1730 generates the profile and transmits output data related to the generated profile to the MNO 1740, the SM-DP 1730 may also transmit the Auth code. Further, the SM-DP 1730 may transmit information on an address of the SM-DP.

At this time, in the fourth embodiment of the profile download method according to the present disclosure, when the SM-DP 1730 transmits the profile ID (or ICCID) and the Auth code to the MNO 1740, the SM-DP 1730 may transmit the same information to the SM-SR 1750 as indicated by reference numeral 1703.

When the SM-DP 1730 transmits information related to the profile to the MNO 1740, the SM-DP 1730 may provide the Auth code and the SM-DP address to the MNO 1740 in the form of a paper card as indicated by reference numeral 1703. In the present disclosure, although the ICCID, the Auth code, and the SM-DP address are described in the form of the paper card, the physical form of the result by the SM-DP 1730 has no limitation and the ICCID, the Auth code, and the SM-DP address may be manufactured as various forms of results.

When the user 1700 applies to subscribe to the service to the MNO 1740 as indicated by reference numeral 1704, the MNO 1740 may transmit information on the received profile ID, Auth code, and SM-DP address to the user 1700 as indicated by reference numeral 1705. At this time, the information may be transmitted in the form of the paper card, and may be specified in the form of a text string, a barcode, or a QR code in the paper card. Further, the corresponding information may be transmitted to the user after inserted into an NFC tag.

In addition, according to an embodiment of the present disclosure, the paper card may be provided to a purchaser of the terminal by a seller of the terminal, but the profile ID, the SM-DP address, or the Auth code may be provided to the user, who purchases the terminal including the eUICC, in the form of the text string, the barcode, or the QR code through a website of the MNO 1740.

Thereafter, the user 1700 may input, into a terminal 1760, information which is related to the profile including the Auth code provided for profile download initiation as indicated by reference numeral 1706.

A method of inputting the information related to the profile download into the terminal 1760 by the user 1700 will be variously configured. For example, the user may directly input the Auth code, the profile ID, or the SM-DP address in the form of text-based information by using a touch screen.

Alternatively, the user may input the Auth code, the profile ID, or the SM-DP address into the terminal 1760 by photographing information in the form of a barcode or a QR code through the camera module of the terminal 1760.

Alternatively, the user may input the Auth code, the profile ID, or the SM-DP address into the terminal 1760 in the form of an NFC tag, which can be read through a contact with an NFC module of the terminal 1760, by using NFC.

Alternatively, the user may input the Auth code, the profile ID, or the SM-DP address into a device, which is linked or connected to the terminal 1760. In this case, the device, which is linked or connected to the terminal 1760, may be a smart phone or a wearable device. At this time, the information related to the downloading of the profile in the form of the barcode or QR code is input through a camera separately provided at the connected device, and the Auth code, the profile ID, or the SM-DP address may be input into the terminal 1760 through wired/wireless communication between the corresponding device and the terminal 1760.

In addition, various embodiments for inputting the Auth code, the profile ID, or the SM-DP address into the terminal 1760 may be implemented, and the present disclosure is not limited to one of the above described methods. This may be an option for selecting a random method from the many methods of inputting the information related to the profile download into the terminal 1760.

In the profile download method performed by the terminal according to the fourth embodiment of the present disclosure, the controller of the terminal, not the eUICC, directly transmits the verification of the authentication code to the SM-SR 1750. Unlike the third embodiment of the present disclosure, the verification of the authentication code is performed by the SM-SR, not the SM-DP 1730.

When information related to profile download including the Auth code is input into the terminal, the controller of the terminal may read an EID corresponding to an identification of the eUICC as indicated by reference numeral 1707, and generate an HTTPS type message, which makes a request for verifying the Auth code initiatively by the terminal and transmit the generated HTTPS type message to the SM-SR 1750 as indicated by reference numeral 1708. At this time, a pull-mode Auth request transmitted to the SM-SR 1750 may include the EID of the eUICC within the terminal and the Auth code, and also a profile ID and an SM-DP address in some cases.

When the SM-SR 1750 receives a request for verifying the authentication code from the controller of the terminal, the SM-SR 1750 may verify the Auth code received from the eUICC by comparing the pre-stored Auth code and the Auth code received from the eUICC as indicated by reference numeral 1709.

When the verification is successful, the SM-SR 1750 may store the successfully verified EID and profile ID in the DB. Further, in this case, the SM-DP address may be also stored.

Thereafter, the SM-SR 1750 transmits a pull-mode Auth response indicating that the EID and Auth code transmitted from the controller of the terminal have been verified to the controller of the terminal as indicated by reference numeral 1710.

When the controller of the terminal receives the pull-mode Auth response indicating the success of the verification of the authentication code, the controller of the terminal may transmit commands, which make a request for downloading the profile in the form of an APDU command, to the ISD-R within the eUICC as indicated by reference numeral 1711. The APDU may be a protocol for data transmission between devices, for example, between a smart card and a computer or a mobile phone.

When the ISD-R of the eUICC receives the APDU command from the controller of the terminal, the ISD-R of the eUICC may generate an HTTP POST message as shown in Table 3 to be transmitted to the SM-SR, and transmit the generated HTTP POST message to the SM-SR 1750 as indicated by reference numeral 1712. The SM-SR 1750 having received the HTTP POST message may search for the corresponding EID in the DB and find the profile ID as indicated by reference numeral 1713. Thereafter, the SM-SR 1750 may transmit a pull-mode D/L request to the SM-DP 1730 as indicated by reference numeral 1714. At this time, the pull-mode D/L request transmitted to the SM-DP 1730 may include the EID of the eUICC and the profile ID. Further, the pull-mode D/L request may include an Auth success indicator indicating the success of the authentication code.

The SM-DP 1730 may identify the Auth success indicator included in the received pull-mode D/L request as indicated by reference numeral 1715, or transmit the corresponding profile without any identification process (since the verification of the authentication code has been already completed) as indicated by reference numeral 1716.

The SM-SR 1750 may transmit the received profile to the eUICC as indicated by reference numeral 1717.

Figure 18:
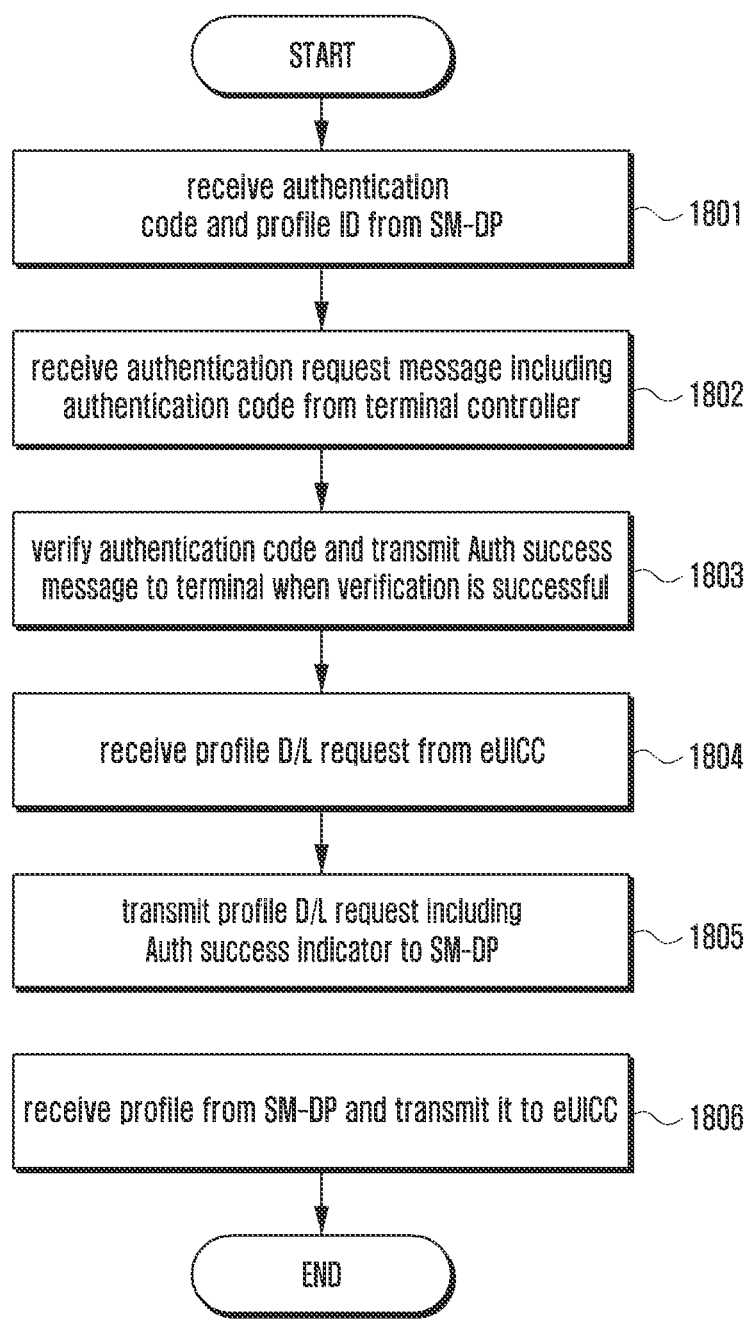
FIG. 18 is a flowchart illustrating an operation of an SM-SR according to an embodiment of the present disclosure.

FIG. 18 is a flowchart illustrating an operation of the SM-SR according to the fourth embodiment of the present disclosure.

Referring to FIG. 18, in operation 1801, the SM-SR receives a profile ID (or ICCID) and an Auth code from the SM-DP. In operation 1802, the SM-SR may receive an authentication request message including the Auth code and an EID from the controller of the terminal. At this time, the authentication request message transmitted by the controller of the terminal may include a profile ID and an SM-DP address as well as the EID and the Auth code.

In operation 1803, the SM-SR may verify the authentication code received from the controller of the terminal by comparing the pre-stored authentication code and the authentication code received from the controller of the terminal, and, when the verification is successful, transmit a pull-mode Auth response message indicating the success of the authentication to the terminal.

In operation 1804, the SM-SR may receive a profile D/L request message from the eUICC.

In operation 1805, the SM-SR may transmit a pull-mode D/L request including an authentication success indicator indicating the success of the verification of the authentication code to the SM-DP. At this time, the pull-mode D/L request may include the EID of the eUICC and the profile ID.

In operation 1806, the SM-SR may receive the corresponding profile from the SM-DP and transmit the received profile to the eUICC.

Unlike the case where the Auth code is verified by the SM-DP (third embodiment), the Auth code is verified by the SM-SR in the fourth embodiment of the present disclosure, but the remaining entity operations are equal. More specifically, the operation of the SM-DP is equal to that in FIG. 10, the operation of the terminal is equal to that in FIG. 15, and the operation of the eUICC is equal to that in FIG. 16. Accordingly, detailed descriptions thereof are omitted herein.

Figure 19:
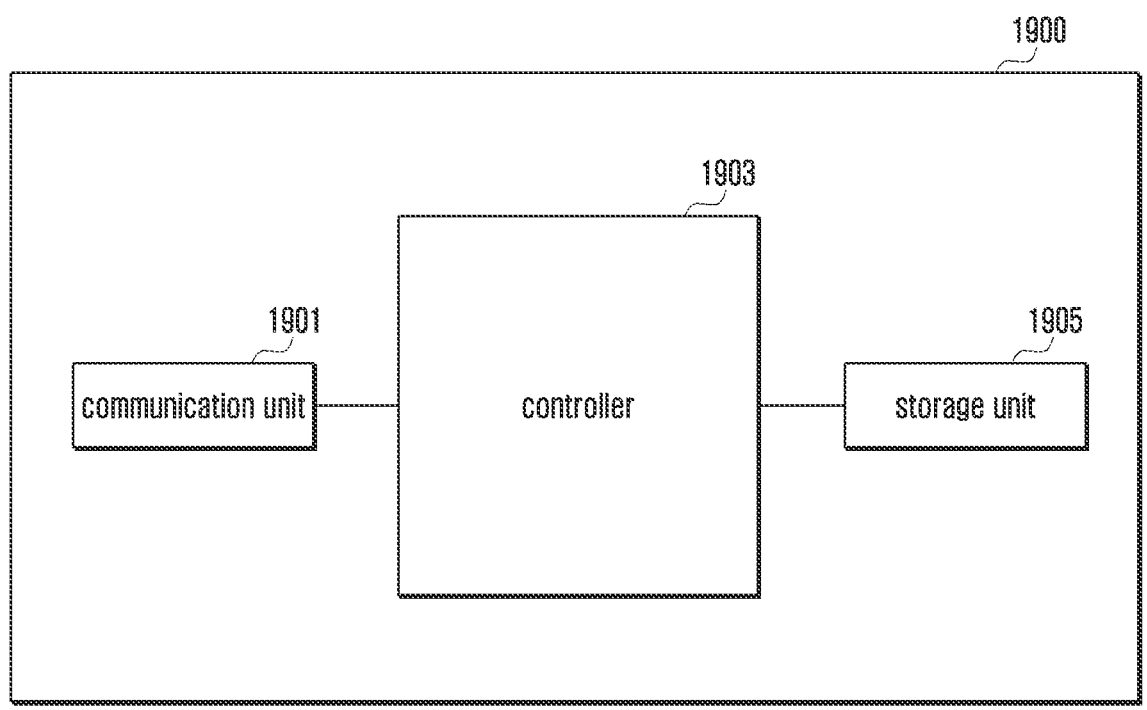
FIG. 19 is a block diagram illustrating a configuration of an SM-DP or an SM-SR according to an embodiment of the present disclosure.

FIG. 19 is a block diagram illustrating a configuration of the SM-DP or the SM-SR according to an embodiment of the present disclosure.

Referring to FIG. 19, the SM-DP or the SM-SR according to the present disclosure may be a server, and each server 1900 may include a communication unit 1901, a controller 1903, and a storage unit 1905.

The communication unit 1901 may perform data communication. A communication scheme of the communication unit 1901 is not limited to one of the wired and wireless communication schemes.

The controller 1903 of the SM-DP may generate authentication information for authenticating a profile to be provided to a terminal and the terminal to download the profile and transmit the profile based on an authentication information verification result of the terminal to download the profile. Further, the controller 1903 may receive the authentication information acquired from the terminal by a profile management server and transmit the profile to the profile management server based on the received authentication information verification result. In addition, the controller 1903 transmits an identification of the generated profile and authentication information to the profile management server, but transmits the profile to the profile management server according to the authentication information verification result of the terminal by the profile management server.

The controller of the SM-SR may receive authentication information for authenticating an installation of the profile from the terminal, receive the profile according to a verification result of the authentication information, and transmit the received profile to the eUICC included in the terminal. Further, the controller may transmit a profile download request including the authentication information received from the terminal to a profile generation server and receive the profile according to a verification result of the authentication information by the profile generation server. In addition, the controller receives the authentication information for authenticating the installation of the profile from the profile generation server, but compares the authentication information received from the profile generation server and the authentication information received from the terminal. When the authentication information received from the profile generation server and the authentication information received from the terminal match each other based on a result of the comparison, the controller may transmit the profile download request to the profile generation server.

Figure 20:
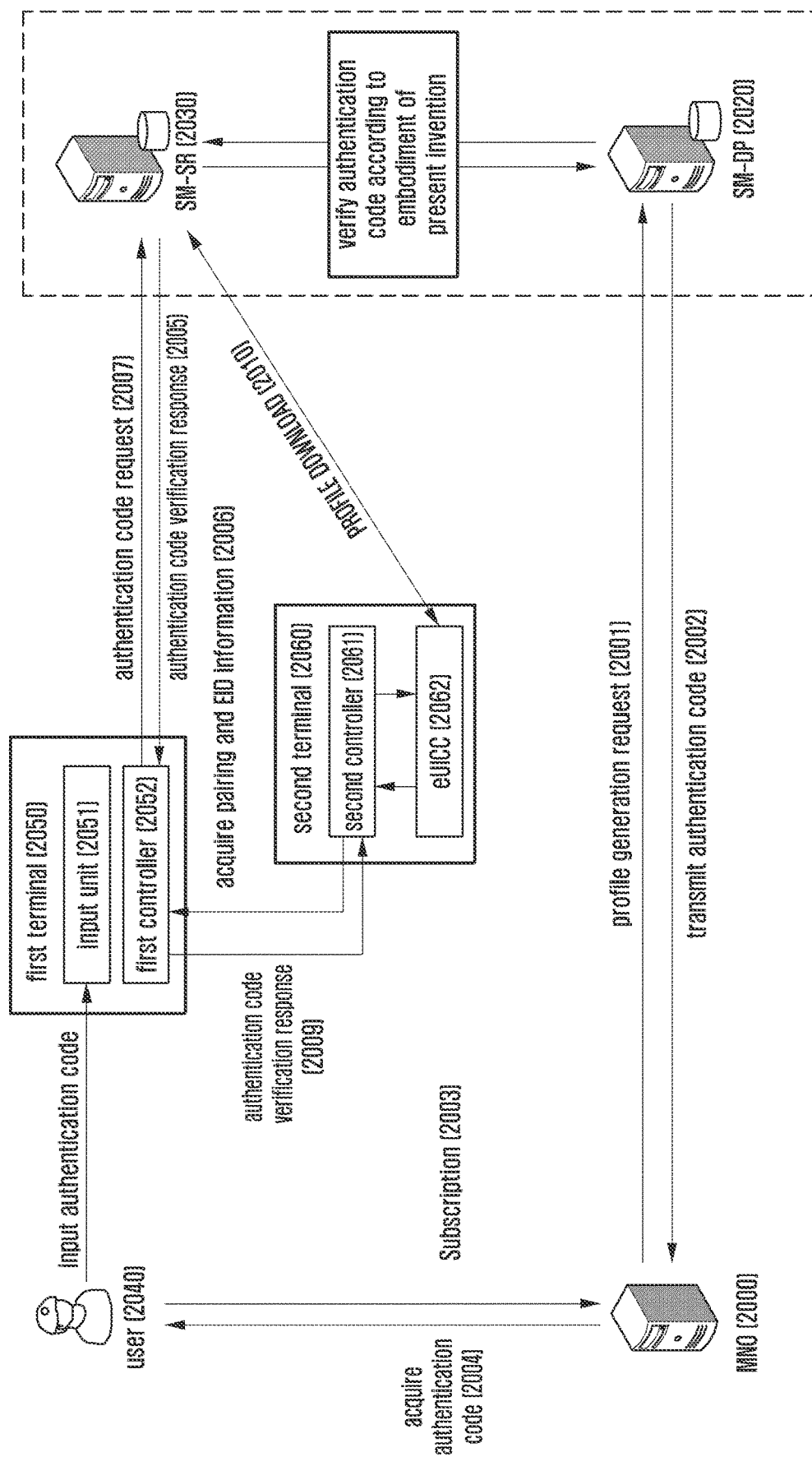
FIG. 20 illustrates an embodiment of a terminal, which installs a profile in an eUICC, according to an embodiment of the present disclosure.

FIG. 20 illustrates an embodiment of the terminal, which installs a profile in the eUICC, according to an embodiment of the present disclosure.

Referring to FIG. 20, when a profile is installed in the eUICC included in the terminal through a verification using an authentication code according to the present disclosure, the terminal may include a first terminal 2050 and a second terminal 2060.

A user 2040 may purchase a set of terminals including the first terminal 2050 and the second terminal 2060 or separately purchase the first terminal 2050 and the second terminal 2060.

The second terminal 2060 may be a terminal dependent on the first terminal 2050. That is, the first terminal 2050 may be a main terminal, and the second terminal 2060 may be sub terminal. In this case, a first controller 2052 of the first terminal 2050 may be a main controller, and a second controller 2061 of the second terminal 2060 may be a sub controller.

In the present disclosure, although the case where an eUICC 2062 is not included in the first terminal 2050 but is included in the second terminal 2060 is described for the convenience of description as an example, the present disclosure is not limited thereto and the eUICC may be included in all of a plurality of terminals. Further, although a case where the number of terminals is 2 is described, two or more terminals, which are configured through the same connection as that between the first terminal 2050 and the second terminal 2060, may operate.

The first terminal 2050 may include an input unit 2051 and the first controller 2052.

The input unit 2051 may include devices, which receive various types of input signals. More specifically, according to an embodiment of the present disclosure, the input unit 2051 may include an audio module, and the audio module may include a speaker, a receiver, earphones, or a microphone to receive sound information input through the microphone.

According to an embodiment of the present disclosure, the input unit 2051 may include a camera module, and the camera module may include an image sensor and a lens to receive a still image and a moving image input through the camera.

According to an embodiment of the present disclosure, the input unit 2051 may be a touch panel, and may include a (digital) pen sensor, a key, or an ultrasonic input device to recognize a physical contact or proximity of the user.

According to an embodiment of the present disclosure, the input unit 2051 may be an RF sensor, and may receive an input by using an NFC tag.

The input unit 2051 according to the present disclosure may operate through various input methods by which an electronic signal can be processed as well as the above described input device.

The first controller 2052 of the first terminal 2050 may perform a verification process of an authentication code to download a profile to be stored in the eUICC 2062 within the second terminal 2060.

The second terminal 2060 may include the second controller 2061 and the eUICC 2062.

The second controller 2061 may serve as a proxy for allowing the first controller 2052 of the first terminal 2050 to acquire an EID of the eUICC 2062 of the second terminal 2060. Further, the second controller 2061 may serve as a proxy for triggering a verification of the authentication code according to the present disclosure.

Hereinafter, operations of the first terminal 2050 and the second terminal 2060 will be described in detail with reference to FIG. 20.

First, an MNO 2000 may first make a request for generating a profile as indicated by reference numeral 2001, and an SM-DP 2020 may generate the profile, generate an authentication code (Auth code) used for downloading the corresponding profile, and transmit the generated Auth code to the MNO 2000 as indicated by reference numeral 2002.

When a user 2040 makes a request for using a mobile communication service to the MNO 2000 in order to use the mobile communication service as indicated by reference numeral 2003, the MNO 2000 transmits the authentication code (Auth code) to the user as indicated by reference numeral 2004. At this time, it has been described that the MNO 2000 transmits the profile ID and the SM-DP address to the user 2040 as well as the authentication code (Auth code).

Further, the authentication code transmitted to the MNO 2000 by the SM-DP 2020 is provided to the MNO 2000 in the form of a paper card. In the present disclosure, although the ICCID, the Auth code, and the SM-DP address are described in the form of the paper card, the physical form of the result by the SM-DP 2020 has no limitation and the ICCID, the Auth code, and the SM-DP address may be manufactured as various forms of results. The information may be specified in the form of a text string, a barcode, or a QR code in the paper card. Further, the corresponding information may be transmitted to the user after inserted into an NFC tag.

The user 2040 may input the authentication code or information related to profile download including the authentication code into the input unit 2051 of the first terminal 2050.

A method of inputting the information related to the profile download into the input unit 2051 by the user 2040 will be variously configured. For example, the user 2040 may directly input the Auth code, the profile ID, or the SM-DP address in the form of text-based information by using a touch screen of the input unit 2051 of the first terminal 2050.

Alternatively, the user 2040 may input the Auth code, the profile ID, or the SM-DP address into the input unit 2051 of the first terminal 2050 by photographing information in the form of a barcode or a QR code through the camera module of the input unit 2051 of the first terminal 2050.

Alternatively, the user 2040 may input the Auth code, the profile ID, or the SM-DP address into the input unit 2051 of the first terminal 2050 in the form of an NFC tag, which can be read through a contact with an NFC module of the input unit 2051 of the first terminal 2050, by using NFC.

Alternatively, the user 2040 may input the Auth code, the profile ID, or the SM-DP address into a device, which is linked or connected to the first terminal 2050. In this case, the device, which is linked or connected to the first terminal 2050, may be a smart phone or a wearable device. At this time, the information related to the downloading of the profile in the form of the barcode or QR code is input through a camera separately provided at the connected device, and the Auth code, the profile ID, or the SM-DP address may be input into the first terminal 2050 through wired/wireless communication between the corresponding device and the first terminal 2050.

When the information related to the profile download including the authentication code is input into the input unit 2051 of the first terminal 2050, the first controller 2052 may determine the existence of the second terminal 2060, which is paired with the first terminal 2050. When the first terminal 2050 and the second terminal 2060 are paired through Bluetooth, the first controller 2052 may acquire the EID of the eUICC 2062 embedded in the second terminal 2060 from the second controller 2061 as indicated by reference numeral 2006.

Thereafter, the verification of the authentication code may be performed according to various embodiments of the verification of the authentication code of the present disclosure.

According to various embodiments of the present disclosure, the eUICC 2062 of the second terminal 2060 makes a request for verifying the authentication code, and the SM-DP 2020 verifies the authentication code. At this time, the first controller 2052 of the first terminal 2050 may receive a request for verifying the eUICC 2062 through the second controller 2061, and accordingly transmit a pull-mode D/L request or a pull-mode Auth request to the SM-SR 2030 as indicated by reference numeral 2007, and receive a response to the request as indicated by reference numeral 2005. The first controller 2052 of the first terminal 2050 transmits the received response to the second terminal 2060. At this time, the verification of the authentication code may be performed by one of the SM-SR 2030 and the SM-DP 2020 according to the first to fourth embodiments. More specifically, when the SM-DP 2020 performs the verification, the SM-SR 2030 may transmit the pull-mode D/L request to the SM-DP 2020. At this time, the corresponding request message may include an EID and an Auth code, and may include a profile ID and an SM-DP address in some cases.

The SM-DP 2020 having received the pull-mode D/L request may verify the terminal, which made the pull-mode D/L request, based on matching of the Auth code. When the verification is successful, the SM-DP 2020 may transmit the profile to the SM-SR 2030. Thereafter, the eUICC 2062 downloads the profile from the SM-SR 2030. In this case, the profile download by the eUICC 2062 may be performed through the first terminal 2050 and the first controller 2052 of the first terminal 2050.

When the SM-SR 2030 receives in advance the Auth codes from the SM-DP 2020 to directly verify the authentication codes, an authentication code verification response transmitted to the first terminal 2050 may be a response indicating the success of the verification as indicated by reference numeral 2005.

When the response indicating the success of the verification is received from the SM-SR 2030, the first controller 2052 of the first terminal 2050 may transmit the corresponding response to the second controller 2061 of the second terminal 2060 as indicated by reference numeral 2009, and the second controller 2061 of the second terminal 2060 may download the profile according to the corresponding response as indicated by reference numeral 2010.

That is, the embodiment of FIG. 20 may use all of the above described verification methods using the authentication code, but has only the difference in that the terminal is divided into two terminals and the first terminal 2050 and the second terminal 2060 are paired through Bluetooth.

According to the present disclosure, when there is a predetermined dependence between terminals such as the main terminal and the sub terminal, that is, pairing through a Bluetooth or Wi-Fi connection, a series of processes related to the verification of the authentication code required for downloading the profile of the eUICC embedded in the sub terminal may be performed by the main terminal. In this case, the controller of the sub terminal (the second controller 2061 of the second terminal 2060 in FIG. 20) may still play the provisioning role according to the related art.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal including a universal integrated circuit card (UICC) in a wireless communication system, the method comprising:
   obtaining authentication code and an address of a profile management server provided from a server of a mobile network operator, the authentication code being used for provisioning an installation of a profile including subscription information for the mobile network operator;
   identifying whether the terminal is paired with at least one terminal including another UICC;
   transmitting the obtained authentication code to the profile management server based on the address of the profile management server;
   receiving, by the terminal, based on whether the terminal is paired with the at least one terminal, the profile corresponding to the authentication code from the profile management server after the terminal is verified based on the authentication code; and
   installing, in the UICC, the received profile for a network access,
   wherein the profile and the authentication code corresponding to the profile are generated by the profile management server based on an integrated circuit card ID (ICCID) of the UICC, in response to a profile generation request transmitted from the server of the mobile network operator, and
   wherein the authentication code generated by the profile management server is transmitted to the server of the mobile network operator.

2. A terminal in a wireless communication system, the terminal comprising:
   a transceiver;
   a universal integrated circuit card (UICC); and
   at least one processor configured to:
   obtain authentication code and an address of a profile management server provided from a server of a mobile network operator, the authentication code being used for provisioning an installation of a profile including subscription information for the mobile network operator,
   identify whether the terminal is paired with at least one terminal including another UICC,
   transmit obtained authentication code to the profile management server based on the address of the profile management server, and
   receive, by the terminal based on whether the terminal is paired with the at least one terminal, the profile corresponding to the authentication code from the profile management server after the terminal is verified based on the authentication code,
   wherein the UICC is configured to install the received profile for a network access,
   wherein the profile and the authentication code corresponding to the profile are generated by the profile management server based on an integrated circuit card ID (ICCID) of the UICC, in response to a profile generation request transmitted from the server of the mobile network operator, and
   wherein the authentication code generated by the profile management server is transmitted to the server of the mobile network operator.

3. The terminal of claim 2, further comprising at least one input unit including at least one of a camera, a near field communication (NFC) interface, and a touch input interface of the terminal.

4. A method by a profile management server in a wireless communication system, the method comprising:
- receiving, from a terminal including a universal integrated circuit card (UICC), authentication code used for provisioning an installation of a profile including subscription information for a mobile network operator, based on an address of the profile management server, wherein the authentication code and the address of the profile management server are provided to the terminal from a server of the mobile network operator;
- verifying the terminal based on the authentication code; and
- transmitting, to the terminal, the profile corresponding to the authentication code after verifying the terminal based on the authentication code, based on whether the terminal is paired with at least one terminal including another UICC,
- wherein the profile is installed in the UICC of the terminal for a network access,
- wherein the profile and the authentication code corresponding to the profile are generated by the profile management server based on an integrated circuit card ID (ICCID) of the UICC, in response to a profile generation request transmitted from the server of the mobile network operator, and
- wherein the authentication code generated by the profile management server is transmitted to the server of the mobile network operator.

5. A profile management server for providing a profile in a wireless communication system, the profile management server comprising:
- a transceiver; and
- at least one processor configured to:
- receive, from a terminal including a universal integrated circuit card (UICC), authentication code used for an installation of a profile including subscription information for a mobile network operator, based on an address of the profile management server, wherein the authentication code and the address of the profile management server are provided to the terminal from a server of the mobile network operator,
- verify the terminal based on the authentication code, and
- transmit, to the terminal, the profile corresponding to the authentication code after verifying the terminal based on the authentication code, based on whether the terminal is paired with at least one terminal including another UICC,
- wherein the profile is installed in the UICC of the terminal for a network access,
- wherein the profile and the authentication code corresponding to the profile are generated by the profile management server based on an integrated circuit card ID (ICCID) of the UICC, in response to a profile generation request transmitted from the server of the mobile network operator, and
- wherein the authentication code generated by the profile management server is transmitted to the server of the mobile network operator.

* * * * *